(12) United States Patent
Greer et al.

(10) Patent No.: US 7,414,081 B2
(45) Date of Patent: *Aug. 19, 2008

(54) COLORED, RADIATION-CURABLE COMPOSITION

(75) Inventors: Robert W. Greer, Lexington, NC (US); Todd Warren Gantt, Catawba, NC (US); Michael B. Purvis, Raleigh, NC (US); Bob J. Overton, Lenior, NC (US)

(73) Assignee: Draka Comteq B.V., Amsterdam (NL)

( * ) Notice: Subject to any disclaimer, the term of this patent is extended or adjusted under 35 U.S.C. 154(b) by 199 days.

This patent is subject to a terminal disclaimer.

(21) Appl. No.: 10/478,668

(22) PCT Filed: May 21, 2002

(86) PCT No.: PCT/US02/15950

§ 371 (c)(1),
(2), (4) Date: Dec. 3, 2004

(87) PCT Pub. No.: WO02/098945

PCT Pub. Date: Dec. 12, 2002

(65) Prior Publication Data

US 2005/0084224 A1  Apr. 21, 2005

Related U.S. Application Data

(63) Continuation-in-part of application No. 09/870,482, filed on Jun. 1, 2001, now Pat. No. 7,091,257, which is a continuation-in-part of application No. 09/360,951, filed on Jul. 27, 1999, now Pat. No. 6,782,176.

(60) Provisional application No. 60/356,160, filed on Feb. 14, 2002.

(51) Int. Cl.
C09D 11/10 (2006.01)
C08F 4/46 (2006.01)

(52) U.S. Cl. .............................. 522/79; 522/90; 522/96; 522/74; 522/134; 522/135; 522/137; 522/141; 522/144; 522/146; 522/173; 522/174; 522/182; 522/904; 522/905; 528/65; 528/66; 528/68; 528/69; 523/160; 523/161; 524/590; 524/871; 106/31.27; 106/31.28; 106/31.6

(58) Field of Classification Search .................. 522/96, 522/90, 74, 7, 75, 134, 135, 137, 141, 144, 522/146, 173, 174, 182, 904, 905, 97; 528/65, 528/66, 45, 68, 69; 523/160, 161; 524/590, 524/871; 106/31.27, 31.28, 31.6; 385/123–128
See application file for complete search history.

(56) References Cited

U.S. PATENT DOCUMENTS

| | | | |
|---|---|---|---|
| 3,157,633 A | 11/1964 | Kuhn | |
| 3,978,096 A | 8/1976 | Eilingsfeld et al. | |
| 4,016,181 A | 4/1977 | Chang | |
| 4,105,680 A | 8/1978 | Chung | |
| 4,200,762 A | 4/1980 | Schmidle | |
| 4,472,021 A | 9/1984 | Ansel et al. | |
| 4,629,285 A | 12/1986 | Carter et al. | |
| 4,666,953 A | 5/1987 | Klemarczyk et al. | |
| 4,846,846 A | 7/1989 | Rekers et al. | |
| 4,954,416 A | 9/1990 | Wright et al. | |
| 5,015,068 A | 5/1991 | Petisce | |
| 5,074,643 A | 12/1991 | Petisce | |
| 5,146,531 A | 9/1992 | Shustack | |
| 5,182,148 A | 1/1993 | Kapp et al. | |
| 5,231,135 A | 7/1993 | Machell et al. | |
| 5,259,060 A | 11/1993 | Edward et al. | |
| 5,302,627 A | 4/1994 | Field et al. | |
| 5,639,846 A | 6/1997 | Shustack | |
| 5,664,041 A | 9/1997 | Szum | |
| 5,933,559 A | 8/1999 | Petisce | |
| 5,958,584 A | 9/1999 | Petisce | |
| 6,001,936 A | 12/1999 | Barrera et al. | |
| 6,011,077 A | 1/2000 | Muller | |

FOREIGN PATENT DOCUMENTS

| EP | 0348 024 | * 12/1989 |
|---|---|---|
| EP | 0 432 931 A | 6/1991 |
| WO | WO 96 11965 A | 4/1996 |
| WO | WO 99 38043 A | 7/1999 |
| WO | WO 01/09053 A1 | 2/2001 |
| WO | WO0109053 | * 2/2001 |

OTHER PUBLICATIONS

Encyclopedia of Chemical Technology, Third Edition, vol. 8 "Diuretics to Emulsions", pp. 212 and 279.
U.S. Appl. No. 60/146,525, filed Jul. 30, 1999.

* cited by examiner

Primary Examiner—Sanza L. McClendon
(74) Attorney, Agent, or Firm—Sughrue Mion, PLLC

(57) ABSTRACT

Radiation-curable compositions, and methods of making the same, for providing a wide variety of substrates with a durable, colored coating or colorant are disclosed. The color is at least in part provided by chromophore molecules that are covalently bonded to other components within the radiation-curable composition. A telecommunication element having a durable color identifying polymeric coating thereon is also disclosed. The telecommunication element comprises an elongated communication transmission medium, such as an optical fiber or an optical fiber ribbon, and a radiation-cured polymeric coating having an identifying color applied on at least a portion of the transmission medium.

60 Claims, 1 Drawing Sheet

COLORED, RADIATION-CURABLE COMPOSITION

CROSS-REFERENCE TO RELATED APPLICATION

This application is a continuation-in-part of application Ser. No. 09/870,482 now U.S. Pat. No. 7,091,257, which is a continuation-in-part of application Ser. No. 09/360,951 now U.S. Pat. No. 6,782,176.

This application discloses and claims subject matter from the following applications:

1) Co-pending application Ser. No. 09/870,482 filed Jun. 1, 2001

2) Co-pending application Ser. No. 09/360,951 filed Jul. 27, 1999;

3) Co-pending PCT application No. PCT/US 01/05814 filed Mar. 16, 2001; and

4) Co-pending provisional application Ser. No. 60/356,160 filed Feb. 14, 2002. The disclosures of these applications are incorporated herein by reference.

BACKGROUND OF THE INVENTION

1. Field of the Invention

The present invention relates to colored, radiation-curable compositions for use in a wide variety of applications, including colored, radiation-curable coating compositions for telecommunications elements, such as optical fibers and optical fiber ribbons, and colored, radiation-curable ink compositions for other applications, such as textile, electronics, and printing applications. More particularly, the present invention relates to colored, radiation-curable compositions for producing a cured, colored coating on a substrate, such as a telecommunications element, the cured compositions having an identifying color provided by chromophore-containing compounds that are covalently bonded to other components within the cured composition.

2. Description of Related Art

For many years now, optical fibers have been used as a reliable transmission medium in telecommunications cables. Typically, an optical fiber comprises a core, a cladding and one or more coatings applied over the cladding.

One purpose of the coatings is to protect the surface of the optical fiber from mechanical scratches and abrasions typically caused by subsequent handling and use. Another purpose of the coatings is to protect the glass from exposure to moisture. The coating or coatings may also have some influence over the fiber's optical characteristics because the coatings are physically responsive to external mechanical forces and temperature. The coating compositions applied to the optical fiber are typically liquid, radiation-curable compositions. Typically, the coating compositions are cured on the optical fiber by exposing the coating composition to ultraviolet radiation, electron beam radiation or ionizing radiation for a predetermined period of time deemed suitable for effective curing.

Telecommunications cables containing optical fibers come in a variety of configurations. In some cables, the optical fibers are held loosely inside a buffer tube. In other cables, the optical fibers are arranged in a planar array to form an optical fiber ribbon. The planar array is typically encapsulated by one or more radiation-curable matrix material layers. The radiation-curable matrix layers are cured by exposing the matrix material to ultraviolet radiation, electron beam radiation, ionizing radiation or infrared radiation for a predetermined period of time deemed suitable for effective curing.

In a telecommunications cable containing multiple optical fibers, the optical fibers may be distinguished from each other by the use of a color coating layer which has been applied over a coated optical fiber. Colors in the color coating layer are usually obtained by dispersing colored pigment particles in a suitable liquid carrier and applying the liquid carrier over the coating. Alternatively, the optical fibers may be distinguished from each other by the use of a so-called colored primary coating, which is a colored coating applied directly onto an optical fiber.

Unfortunately, the use of pigment particles to provide color in color coatings for optical fibers has presented manufacturing and performance problems. For example, the pigment particles and the liquid carrier tend to gradually separate into two distinct phases. As a result, pigmented color coatings have a relatively short shelf life.

In addition, the phase separation in a pigmented coloring system is further complicated by the concurrent agglomeration of pigment particles. Undesirably, the presence of pigment particle agglomerates in a color coating on a coated optical fiber can induce micro-bending which results in transmission losses.

Typically, a relatively high concentration of pigment material is required to achieve an opaque or translucent ultraviolet radiation-curable color coating. Unfortunately, the required high concentration inhibits the transmission of incident ultraviolet radiation which is necessary to cure the color coating material because the pigments refract, reflect and scatter the incident radiation. The inhibition of the ultraviolet radiation results in a reduction in processing speed of the optical fiber along a manufacturing line and thereby increases production costs. Also, the slow cure speed of pigmented color coatings causes the processing and the cure of these materials to be sensitive to minor changes in the thickness of the color coatings.

The use of dyes to provide color in color coatings has been considered as an alternative to pigment-based color coatings. Dyes have the advantage over pigments of faster curing because the dyes do not scatter the curing radiation, although some dyes may absorb light which could slow curing. Dyes, however, are generally not preferred because they diffuse (bleed) out into common cable filling compounds resulting in a color loss. In an effort to reduce the bleeding, U.S. Pat. No. 5,074,643 teaches the use of a polymeric dye in a color coating. The polymeric dyes are macromolecular chromophore-containing molecules that become entrapped in the cross-linked coating network. While the entrapment results in a slowing of the bleeding process, the dyes nevertheless still bleed. Over time, even with the entrapped polymeric dyes, the color imparted to the fibers is likely to be lost and if the color is lost from the fibers, then identification of each of the fibers becomes extremely difficult and time-consuming in the field during fiber-splicing.

The color imparted to the fibers will be lost over time if the dyes themselves lack stability. In particular, the dyes should have sufficient thermal stability and light fastness to impart the desired color for an extended period of time.

If a telecommunications cable has many optical fiber ribbons, it is generally desirable to distinguish one optical fiber ribbon from another by coloring each of the optical fiber ribbons. Typically, color in a colored optical fiber ribbon is obtained in the same way as color is obtained in a color-coated optical fiber. The optical fiber ribbon matrix composition is either provided with pigments or a polymer dye is used. The same problems mentioned above with respect to colored optical fibers apply to colored optical fiber ribbons.

It is desirable to provide a composition that can provide a durable cured color coating that can be used for color coding a telecommunications element, such as an optical fiber, where the coating has the ability to withstand the conditions in a typical operational environment that such elements are typically found. It would also be desirable to provide a composition that can provide a durable cured ink, dye, coating, colorant, etc. that can be used for substrates in other fields, such as textiles, electronics, or printing, where the ink, dye, coating, colorant, etc. has the ability to withstand the conditions in a typical operational environment that such substrates are typically found. The present invention provides such a composition.

SUMMARY OF THE INVENTION

In one aspect of the present invention, there is provided a chromophore-containing compound, wherein the chromophore-containing compound comprises one or more functional groups that are capable of being reacted to covalently bond the chromophore-containing compound with any another molecule or series of molecules in a radiation-curable composition, such that the chromophore-containing compound is incorporated via covalent bonding into the radiation-cured composition.

In one embodiment of the first aspect of the invention, the chromophore-containing compound includes, as one or more functional groups, one or more radiation-curable groups. The chromophore-containing compound comprising one or more radiation-curable groups becomes covalently bonded by one or more covalent bonds to other constituents of a radiation-curable composition during the curing step.

In a second embodiment of the first aspect of the invention, the chromophore-containing compound is a colored oligomer. For example, there may be provided a chromophore-containing compound comprising a chromophore covalently bonded to or within an oligomeric backbone, such that the chromophore of the chromophore-containing compound is attached to the remainder of the oligomer by one or more covalent bonds. The colored oligomer may include radiation-curable groups that become covalently bonded to other constituents of a radiation-curable composition during the curing step.

In another aspect of the present invention, there is provided a radiation-curable composition comprising a chromophore-containing compound, wherein the chromophore-containing compound comprises one or more functional groups that are capable of reacting to covalently bond the chromophore-containing compound with any another molecule or series of molecules in the radiation-curable composition. Upon being subjected to the appropriate level of radiation, the radiation-curable composition provides a radiation-cured composition having a chromophore-containing compound covalently bonded to other molecules or series of molecules within the radiation-cured composition.

In yet another aspect of the invention, there is provided a color concentrate, or masterbatch, comprising the chromophore-containing compound, wherein the color concentrate or masterbatch is a vehicle for the delivery of the chromophore-containing compound to the particularly desired application or embodiment. There is also provided a method for manufacturing such a color concentrate or masterbatch.

In a further aspect of the present invention, there is provided a telecommunication element having a color-identifying coating thereon, the telecommunication element comprising an elongated communication transmission medium and a coating having an identifying color applied on at least a portion of the transmission medium, wherein the coating comprises a radiation-cured, crosslinked polymeric network, and wherein the identifying color in the coating is provided by at least one chromophore molecule covalently bonded by at least one covalent bond to the polymeric network. The color of a telecommunication element prepared in this manner according to the invention does not bleed in the presence of cable-filling compounds. For example, the telecommunication element may be an optical fiber ribbon, and the ribbon has a colored matrix or a colored coating applied over an uncolored matrix, wherein the color of the colored matrix or colored coating does not bleed in the presence of cable-filling compounds.

It is a still further aspect of the present invention to provide: a method for producing a colored, radiation-curable composition having at least one chromophore-containing compound, wherein the chromophore-containing compound comprises one or more functional groups that are capable of being reacted to covalently bond the chromophore-containing compound with any another molecule or series of molecules in the radiation-curable composition; and a method of providing at least a portion of a substrate with a radiation-cured composition having at least one chromophore-containing compound, wherein the chromophore-containing compound is covalently bonded to other molecules or series of molecules within the radiation-cured composition.

The method may comprise the steps of: providing a substrate, such as, for example, a transmission medium; providing a colored, radiation-curable composition comprising a chromophore-containing compound; applying the radiation-curable composition to at least a portion of the substrate; and exposing the radiation-curable composition for a suitable period of time to radiation of a suitable wavelength and intensity to cause curing of the composition into a radiation-cured, crosslinked polymeric network, wherein the identifying color in the coating is provided by at least one chromophore molecule covalently bonded by at least one covalent bond to the polymeric network.

The invention will be more fully understood when reference is made to the following detailed description taken in conjunction with the accompanying drawings.

BRIEF DESCRIPTION OF THE DRAWINGS

The drawings, not drawn to scale, include.

DETAILED DESCRIPTION OF THE PRESENT INVENTION

Figure 1A:
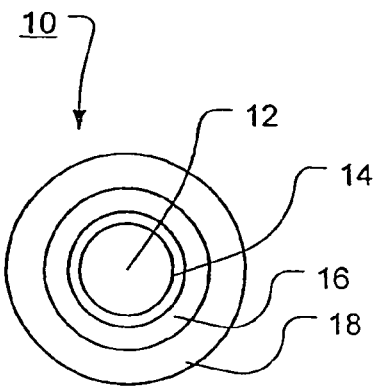
FIG. 1A, which is a cross-sectional view of an optical fiber coated with primary and secondary coatings.

Typical telecommunications elements include an elongated transmission medium such as a metallic wire or an optical fiber. Referring to FIG. 1A, a typical optical fiber 10 transmission medium is shown. The typical optical fiber 10 is formed by a glass core 12 which is surrounded by a glass cladding 14. The glass cladding 14 of the optical fiber 10 is usually surrounded by one or more protective polymeric coatings, e.g., primary and secondary polymeric coatings, or primary, secondary, and tertiary polymeric coatings.

For example, as shown in FIG. 1A, an inner protective polymeric coating 16 covers at least a portion of the cladding 14 and an outer protective polymeric coating 18 typically covers at least a portion of the inner coating 16. The inner 16 and outer 18 protective coatings may be referred to as inner primary and outer primary coatings, or primary and secondary coatings. The inner coating 16 is usually obtained by applying a radiation-curable (polymerizable) composition capable of forming a polymeric coating upon curing over the cladding 14.

The radiation-curable composition is normally applied by passing the optical fiber through a first die or a coating applicator using techniques well known in the art, and therefore, not described herein. Once the radiation-curable composition is applied over the cladding 14, the composition may be cured by exposing it to radiation, such as ultraviolet radiation, electron beam radiation or ionizing radiation, to initiate curing (polymerization) thereof. Ultraviolet radiation is most commonly used.

The application and curing of the radiation-curable composition to form the inner coating 16 may be followed by the application and curing of another radiation-curable composition capable of forming a polymeric coating which forms the outer coating 18. This sequence is known as a wet-on-dry application of the outer coating 18. Alternatively, the application of the radiation-curable composition which forms the inner coating 16 may be directly followed by the application of a radiation-curable composition forming the outer coating 18 prior to exposure to the curing radiation. This is known in the art as a wet-on-wet application. Each application technique is well known in the art.

As used herein, the term "primary coating" is defined as that coating which directly contacts the glass portion of the optical fiber. The uncured primary coating should be liquid at room temperature. The uncured primary coating should have a viscosity suitable for high speed processing, and the uncured primary coating should have a high cure speed. The cured primary coating should exhibit good adhesion to glass to prevent premature delamination of the coating from the glass portion of the optical fiber. The cured primary coating should have a low modulus at lower temperatures to minimize the effects of microbend attenuation due to small stresses on the optical fiber itself.

As used herein, the term "secondary coating" is defined as the coating which covers the primary coating on the optical fiber. The cured secondary coating should have sufficient modulus to give impact resistance and to provide a protective barrier, and give tensile strength to the optical fiber. The cured secondary coating should exhibit little physical change over a wide temperature range and good resistance to water and solvent absorption. For cases where the secondary coating is a colored secondary coating, it should exhibit good color stability.

The uncured liquid primary or secondary coating composition should have a sufficiently low viscosity that the composition will be easily applied to form a continuous protective coating on the glass fibers. Examples of such viscosity of an order of magnitude from about $10^3$ cP at 45-50° C., e.g., from about $2\times10^3$ to about $8\times10^3$ cP at room temperature. There is no particular limitation on viscosity, however, and it can be adjusted to a given application by known methods. For example, viscosity can be adjusted depending on the type of optical fiber material being formulated and the method of application, including the processing temperature employed.

Generally, the thickness of the cured primary or secondary coating will be dependent on the intended use of the optical fiber, although thicknesses of about 20 to 35 microns and, in particular, thicknesses of about 25 to 30 microns are suitable.

When used as primary coatings, cured coatings in accordance with the present invention may have a glass transition temperature ($T_g$) of from about −60° C. to about 0° C., for example, from about −50° C. to about −30° C., and, e.g. about −40° C., and a low modulus of elasticity of from about 0.5 to about 3.0 MPa at room temperature (20° C.) and 50% relative humidity, for example, from about 1.0 to about 2.5 MPa.

When utilized as a secondary coating, cured coatings in accordance with the present invention may have a glass transition temperature ($T_g$) of from about 25 C to about 100° C. The cured secondary coatings may have a $T_g$ of from about 50° C. to about 80° C., for example, about 75° C. The cured secondary coatings may have a low modulus of elasticity of from about 5.0 to about 60 MPa at around 80° C. and 50% relative humidity, for example, from about 20 to about 40 MPa, and, e.g. about 30 MPa.

A typical radiation-curable composition capable of forming a polymeric coating for the inner 16 and outer 18 coatings usually includes an acrylated oligomer, e.g. a urethane acrylate oligomer, which is a reaction product of (1) a polyol, such as a polyether diol, polyester diol or hydrocarbon diol; (2) a polyisocyanate, such as an aliphatic diisocyanate; and (3) an endcapping monomer, such as a hydroxyalkylacrylate or a hydroxyalkylmethacrylate. These oligomers typically have monofunctionality, difunctionality or trifunctionality. Other materials, such as photoinitiators, reactive diluents and adhesion promotors, such as organofunctional silane adhesion promoters, may be included in the radiation-curable composition to tailor the physical properties of the composition to meet specific end-use application requirements, such as to provide good thermal, oxidative and hydrolytic stability as well as a soft, compliant, low glass transition temperature-type coating. A discussion of radiation-curable primary and secondary coating compositions may be found in U.S. Pat. No. 5,146,531, which is incorporated in its entirety herein by reference.

While particular reference has been made to the case of a telecommunication element coated with primary and secondary coatings, it is readily understood by one skilled in the art that such elements may be coated with additional coatings, such as a tertiary coating, or with only one coating. A tertiary coating is generally thinner than a secondary coating, e.g. 10% as thick as a secondary coating. Thus, a tertiary coating may be applied to a thickness of from 2 to 5 microns.

According to the present invention, an uncolored, radiation-curable composition that is, for example, applied over the cladding and cured to form an inner coating 16 may be colored by adding to the composition a chromophore-containing compound comprising one or more functional groups that are capable of reacting to covalently bond the chromophore of the chromophore-containing compound to any another molecule or series of molecules in the radiation-curable composition.

The chromophore moiety of the chromophore-containing compound may be selected from, e.g., dye chemical families including the following, non-exhaustive chemistries: anthraquinone, methine, and azo. Whether the chromophore moiety of the chromophore-containing compound is anthraquinone-type, methine-type, azo-type, mixtures thereof, or some other type, the selected chromophore moiety of the chromophore-containing compound preferably exhibits good thermal stability and light fastness. Furthermore, the chromophore moiety of the chromophore-containing compound is not limited by molecular weight. It may be a monomeric moiety comprising a chromophore, or it may be an oligomeric moiety comprising a chromophore within the backbone of an oligomeric chain or comprising a chromophore as an end or side group of an oligomeric chain.

In general, the functional group(s) of a chromophore-containing compound according to the invention is any group capable of reacting to covalently bond the chromophore of the chromophore-containing compound to any another compound or series of compounds within a radiation-curable composition, such that the chromophore molecule itself is incorporated into the radiation-curable composition. For example, the chromophore-containing compound may comprise a radiation-curable functional group, e.g., ethylenic unsaturation such as an acrylate group, which, when exposed to radiation, covalently bonds with other similar groups in a radiation-curable composition.

In a particular embodiment, the functional group(s) of a chromophore-containing compound according to the invention is capable of reacting with a radiation-curable-group-containing monomer or oligomer to form a radiation-curable monomer or oligomer comprising a chromophore covalently bonded by at least one covalent bond to the monomer or oligomer. The radiation-curable monomer or oligomer comprising the covalently bonded chromophore may itself become covalently bonded to any other compound or series of compounds, such as, for example, a non-chromophore-containing, radiation-curable monomer or oligomer, within a radiation-curable composition.

For example, a radiation-curable monomer or oligomer comprising a chromophore covalently bonded thereto may also have a radiation-curable end group(s) or side group(s). When exposed to radiation, this end group(s) or side group(s) covalently bonds with compounds containing similar groups in the radiation-curable composition. As a particular example, a radiation-curable composition may have compounds containing acrylate groups, vinyl groups or epoxy groups to which a radiation-curable monomer or oligomer comprising a chromophore molecule covalently bonded thereto can covalently bond.

As a more particular example of the embodiment wherein a functional group(s) of a chromophore-containing compound reacts with a radiation-curable-group-containing monomer or oligomer, there is provided a chromophore-containing polyol comprising both hydroxy functionality and a chromophore molecule covalently bonded thereto. The chromophore-containing polyol may have ester or carboxy functionality in addition to the hydroxy functionality. By reacting the polyol comprising a chromophore moiety covalently bonded thereto with, e.g., an oligomer of a radiation-curable composition, the chromophore becomes incorporated not only into the radiation-curable oligomer by way of at least one covalent bond, but ultimately into the cured composition as well.

As a general example of forming a colored monomer or oligomer component of a colored, radiation-curable composition, a polyol comprising a chromophore molecule covalently bonded thereto and hydroxy end groups or side groups is provided, in addition to, or in place of, some or all of the typical polyol, e.g. hydrocarbon diol, that is reacted with an isocyanate, e.g., an aliphatic diisocyanate, and a radiation-curable monomer(s) to form a typical acrylated oligomer reaction product used in a radiation-curable composition for, e.g., optical fiber coatings. Examples of suitable polyols comprising a chromophore molecule covalently bonded thereto are dyes marketed under the trademark REACTINT™ by the Milliken Chemical Company. Those skilled in the art will now recognize that if a sufficient amount of a polyol comprising a chromophore molecule covalently bonded thereto is reacted with an isocyanate and radiation-curable monomer, then the resulting acrylated monomer or oligomer will be colored in accordance with the color of the chromophore molecule(s) (or blend of chromophore molecules for certain colors within the spectrum of colors) that has been covalently bonded to the monomer or oligomer.

Figure 1B:
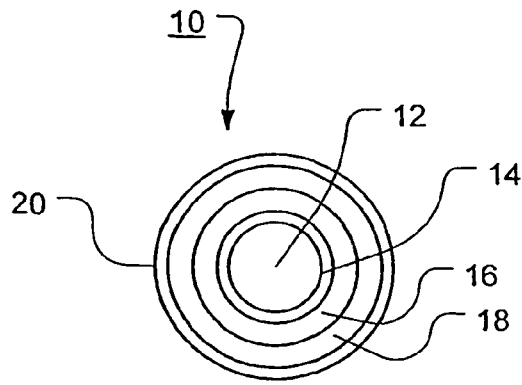
FIG. 1B, which is a cross-sectional view of an optical fiber coated with primary, secondary and tertiary coatings.

A radiation-curable composition comprising a chromophore-containing compound according to the invention, e.g., a colored, acrylated monomer or oligomer, may be applied, e.g., directly to the cladding of the optical fiber as a colored, radiation-curable composition to form the inner coating 16 or it may be applied directly over a previously applied inner coating as the outer coating 18. Those skilled in the art will recognize that the radiation-curable composition comprising a chromophore-containing compound according to the invention, e.g., a colored monomer or oligomer, may also be applied over a previously applied outer coating as a tertiary coating 20, which is illustrated in FIG. 1B. Alternatively, the radiation-curable composition comprising a chromophore-containing compound according to the invention, e.g., a colored, acrylated monomer or oligomer, may be applied onto or into a ribbon matrix, producing a colored optical fiber ribbon.

In a commercially advantageous alternative, chromophore-containing compounds according to the invention, e.g., colored, acrylated monomers or oligomers, are blended or diluted with non-chromophore-containing analogs that are present in a commercially available, uncolored, radiation-curable composition, such as those compositions typically formulated to provide a protective coating on an optical fiber, so that the combination of the chromophore-containing compounds according to the invention and the non-chromophore-containing analogs forms a colored, radiation-curable composition which can be applied, e.g., over the cladding 14, the inner coating 16 or the outer coating 18 of the optical fiber (or onto or into a ribbon matrix). Such radiation-curable compositions may additionally include one or more uncolored acrylate oligomers, a reactive diluent, one or more photoinitiators, organofunctional silane adhesion promoters, pigments, e.g., $TiO_2$, stabilizers, etc. In other words, the chromophore-containing compounds described herein may be added, in a quantity sufficient to impart color, to a commercially known, uncolored, radiation-curable composition, such as those used to provide a protective coating over an optical fiber.

After the radiation-curable composition containing the chromophore-containing compounds, e.g., the colored monomers and/or oligomers, is cured, i.e., polymerized, by exposure to radiation of a suitable wavelength and intensity for a suitable period of time, the resulting cured composition contains chromophore molecules which are covalently bonded thereto. Because the chromophore molecules are covalently bonded to other components within the cured composition, the risk of color loss due to bleeding is negligible. Thus, the manufacturing advantages that a dye provides over pigments, e.g. application and cure speed, can be obtained while avoiding the bleeding disadvantages that a dye which is not covalently bonded may have when used in an optical fiber environment, or in any other working environment.

According to one embodiment, a chromophore-containing compound is provided which may be suited, amongst other applications, for imparting color to a telecommunication element, such as a coated optical fiber or coated optical fiber ribbon. The chromophore-containing compound may be formed via, e.g., isocyanate chemistry. For example, a chromophore-containing compound comprising an isocyanate-reactive functional group(s), e.g., —OH, —$NH_2$ and —SH, may be reacted with an isocyanate comprising a radiation-curable group, e.g., comprising ethylenic unsaturation. An example of an isocyanate comprising a radiation-curable group is meta-isopropenyl-α,α-ethyl isocyanate, but any monoisocyanate or polyisocyanate, including a diisocyanate, may be employed, provided that it comprises a radiation-curable group.

According to another embodiment, a particular type of chromophore-containing compound, i.e., a chromophore-containing oligomer, is provided which may be suited, amongst other applications, for imparting color to a communications element, such as a coated optical fiber. This chromophore-containing oligomer may be formed in several manners. For example, the chromophore moiety of the chromophore-containing oligomer may be bonded by one covalent bond to the remainder of the oligomer, such that the chromophore moiety is provided as an end group or side group of the oligomer. Alternatively, the chromophore moiety of the chromophore-containing oligomer may be bonded by a pair of covalent bonds to the remainder of the oligomer, such that the chromophore moiety is provided as part of the backbone of the oligomer.

An example for providing a chromophore-containing oligomer having the chromophore moiety as part of the backbone of the oligomer includes a step of forming an oligomer precursor having at least two terminal isocyanate groups. This oligomer precursor may be said to be end-capped with isocyanate groups.

The isocyanate-end-capped oligomer may be converted into an oligomer end-capped with radiation-curable groups. For example, the isocyanate-end-capped oligomer precursor may be reacted with a radiation-curable monomer including both (i) a reactive functionality which is reactive with the isocyanate groups of the isocyanate-end-capped oligomer precursor and (ii) a radiation-curable functionality, including ethylenic unsaturation. Groups which are reactive with isocyanate groups include —OH, —NH$_2$ and —SH. The reaction with the isocyanate groups generates covalent linkages. For example, the reaction of an —OH group with an isocyanate group creates a urethane linkage, and the reaction of an —NH$_2$ group with an isocyanate group creates a urea linkage.

The isocyanate-end-capped oligomer precursor is prepared by reacting at least one isocyanate, such as a polyisocyanate, e.g., diisocyanate, with at least one polyfunctional compound having at least two isocyanate-reactive groups, such as —OH, —NH$_2$ and —SH. A particular polyfunctional compound of this type is a diol.

At least a portion of the polyfunctional compound, e.g., diol, includes a chromophore, such as an anthraquinone, methine or azo chromophore. For example, suitable examples of anthraquinone chromophores are given in an article entitled "Dyes, Anthraquinone" at pages 212-279 of the *Kirk-Othmer Encyclopedia of Chemical Technology*, Third Edition, Volume 8, 1979.

A particular example of a polyfunctional compound including a chromophore is an anthraquinone dye having the following formula:

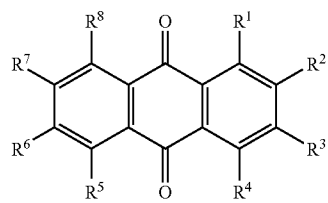

wherein the R groups R$^1$, R$^2$, R$^3$, R$^4$, R$^5$, R$^6$, R$^7$ and R$^8$, are each independently selected from the group consisting of hydrogen, amino, hydroxy, halogen, nitro, carboxy- lated alkali metal, sulfated alkali metal and a hydrocarbyl group optionally containing one or more heteroatoms, provided that at least two of groups R$^1$ through R$^8$ have at least one isocyanate-reactive functionality selected from the group consisting of —OH, —NH$_2$ and —SH, and further wherein adjacent R groups from amongst R groups R$^1$ through R$^8$ may form a ring.

An example of a compound wherein adjacent R groups from amongst R groups R$^1$ through R$^8$ form a ring is a compound wherein R$^1$ and R$^2$ combine to form a benzene ring.

When an R group from amongst R groups R$^1$ through R$^8$ is a hydrocarbyl group including a heteroatom, the heteroatom may appear anywhere in the group, for example, the heteroatom may appear (1) as a linking group attached directly to the anthraquinone core, (2) as a side group, or (3) as a linking group linking two or more hydrocarbyl groups together.

For example, from 1 to 3 of R groups R$^1$ through R$^8$ may have the following formula:

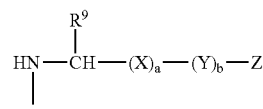

wherein R$^9$ is hydrogen or an alkyl group having from 1 to about 12 carbon atoms, X is —CH$_2$—, a is an integer of from 1 to about 6, Y represents polymeric units of hydroxy alkylenes or alkylene oxide monomers selected from the group consisting of ethylene oxide, propylene oxide, butylene oxide, cyclohexane oxide, and glycidol, b is either 0 or 1, and Z is a reactive —OH, —NH$_2$, or —SH group.

Specific examples of such anthraquinone dyes are described in U.S. Pat. No. 4,846,846 and may have the following formula:

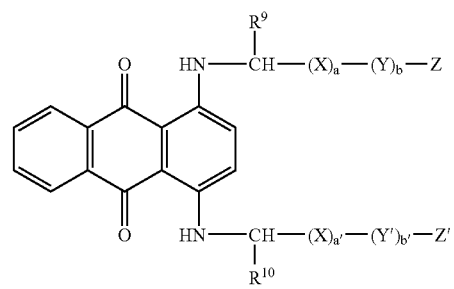

wherein R$^9$ and R$^{10}$ are independently selected from hydrogen or an alkyl group having from 1 to about 12 carbon atoms, X is —CH$_2$—, a and a' are independently selected from integers of from 1 to about 6, Y and Y' are independently selected from polymeric units of hydroxy alkylenes or alkylene oxide monomers selected from the group consisting of ethylene oxide, propylene oxide, butylene oxide, cyclohexane oxide, and glycidol, b and b' are independently either 0 or 1, and Z and Z' are independently selected from reactive —OH, —NH$_2$, or —SH groups.

As described in U.S. Pat. No. 4,846,846, a particular subclass of such anthraquinone dyes may have the following formula:

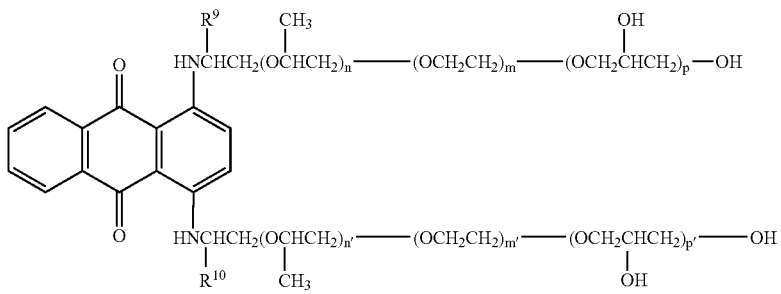

wherein n, n', m, m', p, and p' may independently have a value of from 0 to about 40.

A particular example of an anthraquinone dye described in U.S. Pat. No. 4,846,846 has the following formula:

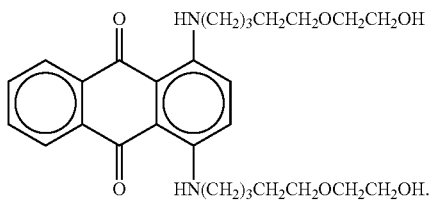

Other examples of anthraquinone dyes include 1,5-bis((3-hydroxy-2,2-dimethylpropyl)amino)-9,10-anthracenedione, which is a red dye; 2,2'-((9,10-dihydro-9,10-dioxo-1,5-anthracenediyl)bis(thio))bis-benzoic acid, 2-hydroxyethyl ester, which is a yellow dye; and 1,5-bis((2,2-dimethyl-3-hydroxypropyl)amino)-4,8-bis((4-methylphenyl)thio)anthraquinone, which is a blue dye. Other colors, such as pink, green, black, brown and violet, may be formed by blending these dyes or by blending oligomers containing the same.

There are still further types of chromophore-containing compounds comprising functional groups that may be used to covalently link chromophores to the polymeric matrix of coating compositions, inks, colorants, etc. For example, there may be provided a radiation-curable anthraquinone dye comprising an anthraquinone core group with at least one substituent comprising a radiation-curable group. The radiation-curable group may be an ethylenically-unsaturated group, such as a (meth)acrylic group, or an epoxy group.

A radiation-curable anthraquinone dye comprising an anthraquinone core group with at least one substituent comprising a radiation-curable group may have the following formula:

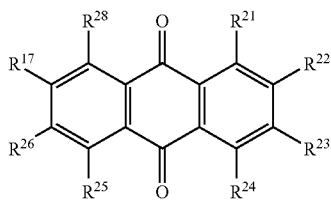

wherein the R groups $R^{11}$, $R^{12}$, $R^{13}$, $R^{14}$, $R^{15}$, $R^{16}$, $R^{17}$ and $R^{18}$ are each independently selected from the group consisting of hydrogen, amino, hydroxy, halogen, nitro, carboxylated alkali metal, sulfated alkali metal and a hydrocarbyl group optionally containing one or more heteroatoms, provided that at least one of groups $R^{11}$ through $R^{18}$ have at least one ethylenically-unsaturated radiation-curable functionality.

For example, one or two of R groups $R^{11}$ through $R^{18}$ may have a (meth)acrylic functionality and at least four of R groups $R^{11}$ through $R^{18}$ may be hydrogen.

Radiation-curable anthraquinone dyes comprising an anthraquinone core group with at least one substituent comprising a radiation-curable group may be formed by esterification reactions of hydroxy-functional anthraquinone dyes with acrylic acid-type monomers. For example, the above-mentioned dihydroxy functional anthraquinone dyes, i.e. 1,5-bis((3-hydroxy-2,2-dimethylpropyl)amino)-9,10-anthracenedione, 2,2'-((9,10-dihydro-9,10-dioxo-1,5-anthracenediyl)bis(thio))bis-benzoic acid, 2-hydroxyethyl ester, and 1,5-bis((2,2-dimethyl-3-hydroxypropyl)amino)-4,8-bis((4-methylphenyl)thio)anthraquinone, could undergo such esterification reactions to form the following compounds, respectively:

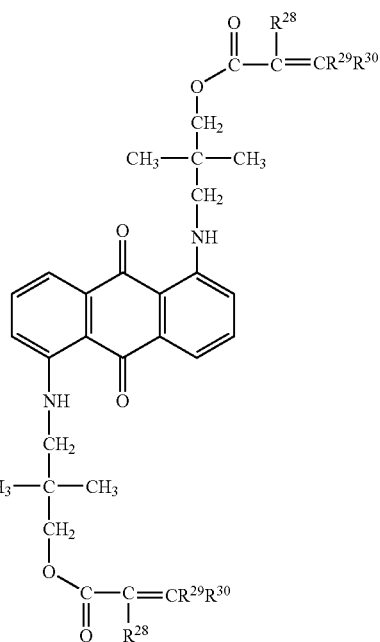

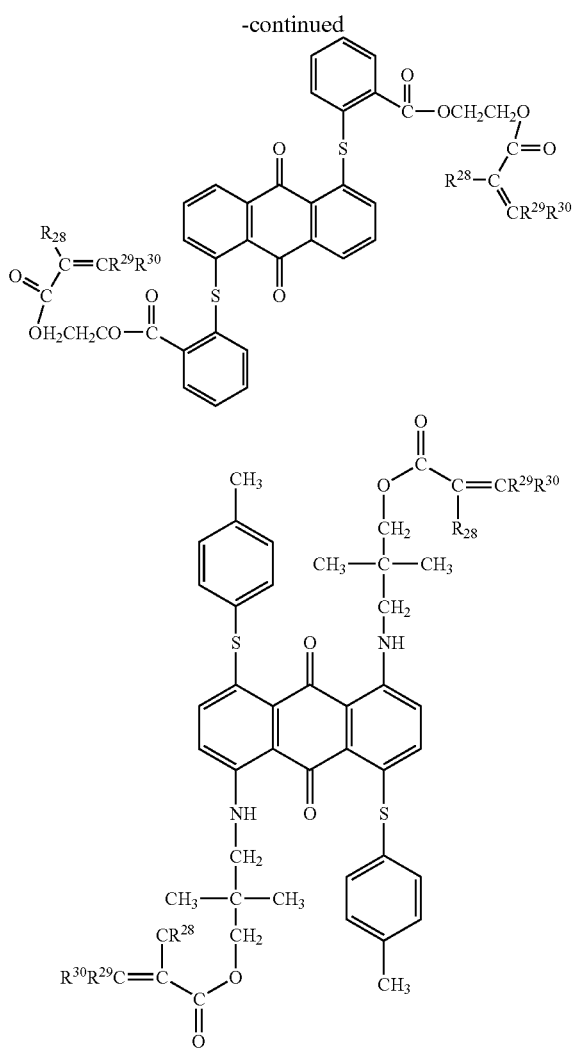

wherein $R^{29}$, $R^{30}$, $R^{31}$, $R^{32}$, $R^{33}$, and $R^{34}$ are the same or different and are independently hydrogen or a $C_1$ to $C_6$ alkyl optionally substituted with one or more substituents selected from the group consisting of —OH, —$NH_2$, —SH, —$NO_2$, —CN and halogen.

A radiation-curable, chromophore-containing compound according to the invention, may be mixed with standard components of a radiation-curable composition, such as standard components of radiation-curable compositions for coating a communications element, e.g., an optical fiber, an optical fiber ribbon, or a plurality of optical fibers arranged in an array, or standard components of radiation-curable compositions for forming inks or colorant packages. Such components may include one or more of (1) at least one non-chromophore-containing, radiation-curable compound, (2) at least one photoinitiator, and (3) at least one reactive diluent.

A specific example of a non-chromophore-containing, radiation-curable compound is a non-chromophore-containing, radiation-curable oligomer, such as a (meth)acrylate end-capped urethane oligomer, which may be any one of the polyether-based, aliphatic urethane acrylate compounds commercially available from UCB Chemical Corp. They are sold under the name EBECRYL, and include EBECRYL 230. EBECRYL 230 is a difunctional aliphatic urethane acrylate oligomer with a polyether backbone.

Another example of a (meth)acrylate end-capped urethane oligomer is any one of the polyester-based, aliphatic urethane acrylate oligomers that are available from Sartomer. They are sold under the name CN966xxx, and include CN966J75, a difunctional aliphatic urethane acrylate oligomer with a polyester backbone. These oligomers are also available from Henkel Corp., which manufactures PHOTOMER products, including PHOTOMER 6010. A polyester polyol, which can be used to make a polyester-based urethane acrylate oligomer, is DESMOPHEN 2001KS, available from Bayer Corp. This product is an ethylene butylene adipate diol.

Alternatively, conventional urethane acrylate oligomers may be formed by reacting a polyol, for example a diol, with a multifunctional isocyanate, for example a diisocyanate, and then end-capping with a hydroxy-functional (meth)acrylate.

The polyol may be a polyol with a number average molecular weight of about 200-10,000, such as polyether polyol, polyester polyol, polycarbonate polyol, and hydrocarbon polyol.

Polyether polyols may be homopolymers or copolymers of alkylene oxides including $C_2$ to $C_5$ alkylene oxides such as, for example, ethylene oxide, propylene oxide, butylene oxide, tetrahydrofuran, and 3-methyltetrahydrofuran; homopolymers or copolymers of the above alkylene oxides obtained by using, as an initiator, $C_{14}$ to $C_{40}$ polyols, such as 12-hydroxystearyl alcohol and hydrogenated dimerdiol; and adducts of the above alkylene oxides with bisphenol-A or hydrogenated bisphenol-A. These polyether polyols may be used alone or in combination of two or more.

Polyester polyols may be, for example, addition reaction products of a diol component and a lactone, reaction products of the diol component and a polyvalent carboxylic acid, and addition reaction products of three components, including the diol component, a dibasic acid, and the lactone. The diol component may be $C_2$ to $C_{40}$ aliphatic diols with a low molecular weight such as ethylene glycol, propylene glycol, diethylene glycol, dipropylene glycol, 1,4-butanediol, 1,5-pentanediol, 3-methyl-1,5-pentanediol, 2,4-diethyl-1,5-pentanediol, 1,6-hexane glycol, neopentyl glycol, 1,9-nonanediol, 1,10-decanediol, 12-hydroxystearyl alcohol, and hydrogenated dimerdiol; and an alkylene oxide adduct of bisphenol-A. The lactone may be, for example, epsilon-caprolactone, delta-valerolactone, and beta-methyl-delta-valerolactone. The polyvalent carboxylic acid may be, for example, aliphatic dicarboxylic acids such as succinic acid, adipic acid, azelaic acid, sebacic acid, and dodecanedioic acid; and aromatic dicarboxylic acids such as hexahydrophthalic acid, tetrahydrophthalic acid, phthalic acid, isophthalic acid, and terephthalic acid.

Polycarbonate polyols may be, for example, polycarbonate diols which are obtainable by a reaction of a short chain dialkylcarbonate and a component selected from aforementioned polyether polyols, polyester polyols and diol components such as 2-methylpropanediol, dipropylene glycol, 1,4-butanediol, 1,6-hexanediol, 3-methyl-1,5-pentanediol, neopentyl glycol, 1,5-octanediol, and 1,4-bis-(hydroxymethyl)cyclohexane. The short chain dialkylcarbonate may be $C_1$-$C_4$ alkylcarbonates such as, for example, dimethylcarbonate and diethylcarbonate.

Polyols with a low molecular weight may be used. Examples of polyols with a low molecular weight include ethylene glycol, propylene glycol, tripropylene glycol, 1,3- or 1,4-butanediol, neopentyl glycol, 1,6-hexanediol, 1,9-nonanediol, 1,10-decanediol, higher fatty acid polyols and higher hydrocarbon polyols such as castor oil, coconut oil, monomyristins (1-monomyristin and 2-monomyristin), monopalmitins (1-monopalmitin and 2-monopalmitin), monostearins (1-monostearin and 2-monostearin), monooleins (1-monoolein and 2-monoolein), 9,10-dioxystearic acid, 12-hydroxyricinoleyl alcohol, 12-hydroxystearyl alcohol, 1,16-hexadecanediol (juniperic acid or a reduction product of thapcic acid), 1,21-henicosanediol, chimyl alcohol, batyl alcohol, selachyl alcohol and dimeric acid diol.

As previously explained, any of the above-mentioned polyols, which may be used to prepare conventional (meth)acrylate end-capped oligomers, may be blended with polyols including chromophoric groups and reacted with isocyanates to form colored oligomers.

An isocyanate used to form a colored or uncolored monomer or oligomer, may be, for example, an aromatic polyisocyanate, an aromatic aliphatic polyisocyanate, an alicyclic polyisocyanate, or an aliphatic polyisocyanate. The particular isocyanate selected is not limited by molecular weight. It may be a so-called monomeric isocyanate, or it may be an oligomeric isocyanate.

Examples of the aromatic polyisocyanates include diisocyanates such as m-phenylene diisocyanate, p-phenylene diisocyanate, 4,4'-diphenyl diisocyanate, 1,5-naphthalene diisocyanate, 4,4'-diphenylmethane diisocyanate, 2,4- or 2,6-tolylene diisocyanate, 4,4'-toluidine diisocyanate, and 4,4'-diphenyl ether diisocyanate; and polyisocyanates such as triphenylmethane-4,4',4"-triisocyanate, 1,3,5-triisocyanate-benzene, 2,4,6-triisocyanatetoluene, and 4,4'-diphenylmethane-2,2',5,5'-tetraisocyanate.

Examples of the aromatic aliphatic polyisocyanates include diisocyanates such as 1,3- or 1,4-xylene diisocyanate or mixtures thereof and 1,3- or 1,4-bis(1-isocyanate-1-methylethyl)benzene or mixtures thereof; and polyisocyanates such as 1,3,5-triisocyanatemethylbenzene.

Examples of the alicyclic polyisocyanates include diisocyanates such as 1,3-cyclopentene diisocyanate, 1,4-cyclohexane diisocyanate, 1,3-cyclohexane diisocyanate, 3-isocyanatemethyl-3,5,5-trimethylcyclohexyl isocyanate (isophorone diisocyanate or IPDI), 4,4'-methylenebis(cyclohexyl isocyanate) ($H_{12}$MDI or DESMODUR W, available from Bayer), methyl-2,4-cyclohexane diisocyanate, methyl-2,6-cyclohexane diisocyanate, and 1,3- or 1,4-bis (isocyanatemethyl)cyclohexane; and polyisocyanates such as 1,3,5-triisocyanatecyclohexane, 1,3,5-trimethylisocyanatecyclohexane, 2-(3-isocyanatepropyl)-2,5-di(isocyanatemethyl)-bicyclo(2.2.1)heptane, 2-3-isocyanatepropyl)-2,6-di(isocyanatemethyl)-bicyclo(2.2.1)heptane, 3-(3-isocyanatepropyl)-2,5-di(isocyanatemethyl)-bicyclo(2.2.1)heptane, 5-(2-isocyanateethyl)-2-isocyanatemethyl-3-(3-isocyanatepropyl)-bicyclo(2.2.1)heptane, 6-(2-isocyanateethyl)-2-isocyanatemethyl-3-(3-isocyanatepropyl)-bicyclo(2.2.1)heptane, 5-(2-isocyanateethyl)-2-isocyanatemethyl-2-(3-isocyanatepropyl)-bicyclo(2.2.1)heptane, and 6-2-isocyanateethyl)-2-isocyanatemethyl)-2-(3-isocyanatepropyl)-bicyclo(2.2.1)heptane.

Examples of the aliphatic polyisocyanates include diisocyanates such as trimethylene diisocyatnate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, and 2,6-diisocyanatemethylcaproate; and polyisocyanates such as lysine ester triisocyanate, 1,4,8-triisocyanateoctane, 1,6,11-triisocyanateundecane, 1,8-diisocyanate-4-isocyanatemethyloctane, 1,3,6-triisocyanatehexane, and 2,5,7-trimethyl-1,8-isocyanate-5-isocyanatemethyloctane.

Moreover, derivatives from the above polyisocyanates can be used. Examples of the derivatives include a dimer, a trimer, biuret, allophanate, carbodiimide, polymethylenepolyphenyl polyisocyanate (referred to as crude MDI or polymeric MDI), crude TDI, and an adduct of an isocyanate compound and a polyol with a low molecular weight.

While several polyisocyanates, including diisocyanates, have been disclosed, it must be noted that monoisocyanates may also be employed, provided that it contains a radiation-curable functional group. An example of a monoisocyanate comprising a radiation-curable group is meta-isopropenyl-α,α-dimethyl isocyanate.

"(Meth)acrylate" means acrylate, methacrylate, or a mixture thereof.

The reaction product of polyol and polyisocyanate may be reacted with one or more hydroxy-functional (meth)acrylates. Examples of the hydroxy-functional (meth)acrylates include 2-hydroxyethyl (meth)acrylate, 2-hydroxypropyl (meth)acrylate, 2-hydroxybutyl (meth)acrylate, 4-hydroxybutyl (meth)acrylate, pentanediol mono(meth)acrylate, 2-hydroxy-3-phenyloxypropyl (meth)acrylate, 2-hydroxyalkyl (meth)acryloyl phosphate, 4-hydroxycyclohexyl (meth)acrylate, cyclohexanedimethanol mono(meth)acrylate, neopentyl glycol mono(meth)acrylate, trimethylolpropane di(meth)acrylate, and pentaerythritol tri(meth)acrylate. Additional examples include compounds which are obtainable by an addition reaction of a glycidyl group-containing compound and a (meth)acrylic acid, such as alkyl glycidyl ether and glycidyl (meth)acrylate. The above hydroxyl group-containing (meth)acrylates may be used alone or in combination of two or more.

The molecular weight range of radiation-curable oligomers is not particularly limited, but preferably varies from 5,000 to 25,000 MW based upon the specific requirements for properties of the primary, secondary or tertiary coating in accordance with the present invention.

Any suitable free radical photoinitiator may be included in the radiation-curable composition. Suitable free radical-type photoinitiators include, for example, an acyl phosphine oxide photoinitiator, more specifically, a benzoyl diaryl phosphine oxide photoinitiator. An example of suitable benzoyl diaryl phosphine oxide photoinitiators include: 2,4,6-trimethylbenzoyldiphenyl-phosphine oxide (LUCERIN TPO available from BASF). Further examples of free radical-type photoinitiators include: hydroxycyclohexylphenylketone; hydroxymethylphenylpropanone; dimethoxyphenylacetophenone; 2-methyl-1-[4-(methyl thio)-phenyl]-2-morpholinopropanone-1; 1-(4-isopropylphenyl)-2-hydroxy-2-methylpropan-1-one; 1-(4-dodecyl-phenyl)-2-hydroxy-2-methylpropan-1-one; 4-(2-hydroxyethoxy)phenyl-2(2-hydroxy-2-propyl)-ketone; diethoxyphenyl acetophenone; 2,4,6-trimethylbenzoyl diphenylphosphone; a mixture of (2,6-dimethoxy benzoyl)-2,4,4-trimethylpentylphosphineoxide and 2-hydroxy-2-methyl-1-phenyl-propane-1-one; and mixtures of the foregoing. Many of these are sold under the names IRGACURE® and DAROCUR® and are available from Ciba Additives.

The free radical photoinitiator may be a mixture of phosphine oxide photoinitiators, an example of which is DAROCUR 4265 available from Ciba Additives. This particular photoiniator is a 50:50 weight percent mixture of diphenyl-2,4,6-trimethyl benzoly phosphine oxide and 2-hydroxy-2-methyl-1-phenylpropan-1-one. Another is IRGACURE 1700 (also from Ciba Additives), a blend of bis(2,6-dimethoxybenzoyl)-2,4,4-trimethylpentylphosphine oxide and 2-hydroxy-2-methyl-1-phenyl-propane-1-one.

The free radical-type photoinitiator may be used in an amount of 10% or less by weight, for example, about 0.25 to about 6% by weight, e.g., about 4% by weight based upon the total weight of the composition.

Adequate curing of the present compositions is promoted by the presence of one or more reactive diluents. The reactive diluent may also function as a solvent, such as, for example, a solvent for the urethane acrylate oligomer. The use of the reactive diluent(s) allows the formulator to adjust the viscosity and thereby improve processability. In other words, the reactive diluent prevents the viscosity of the composition from becoming too viscous or inflexible so as to ensure that the composition will remain suitable for its applications, including, for example, as a primary or secondary optical fiber coating.

The mono- or di-functional reactive diluent(s) may, for example, be a lower molecular weight, liquid (meth)acrylate-functional compound including the following di(meth)acrylates and monofunctional (meth)acrylates: tridecyl acrylate, 1,6-hexanediol diacrylate, 1,4-butanediol diacrylate, ethylene glycol diacrylate, diethylene glycol diacrylate, tetraethylene glycol diacrylate, tripropylene glycol diacrylate, neopentyl glycol diacrylate, 1,4-butanediol dimethacrylate, poly(butanediol) diacrylate, tetrathylene glycol dimethacrylate, 1,3-butylene glycol diacrylate, tetraethylene glycol diacrylate, triisopropylene glycol diacrylate, triisopropylene glycol diacrylate, ethoxylated bisphenol-A diacrylate, and tetrahydrofurfuryl acrylate (THFA). Another example of a reactive diluent is N-vinyl caprolactam. Further examples are the commercially available products from Sartomer, SR 489, a tridecyl acrylate and SR 506, an isobornyl acrylate.

The present radiation-curable compositions may be free of non-reactive diluents, such as water or organic solvents, which lack ethylenic unsaturation.

In the case where the radiation-curable composition is to be used as a primary coating composition for optical fibers, the radiation-curable composition may include an adhesion promoter. Examples of adhesion promoters include acid functional materials and organofunctional silanes. For example, the organofunctional silane may be an amino-functional silane, an acrylamido-functional silane, a mercapto-functional silane, an allyl-functional silane, a vinyl-functional silane, a methylacrylate-functional silane, and an acrylate-functional silane. The organofunctional silane may be mercaptoalkyl trialkoxyl silane, a methacryloxylalkyl trialkoxy silane, an aminoalkyl trialkoxyl silane, a vinyl trialkoxyl silane, 3-aminopropyl triethoxy silane, 3-methacryloxy-propyltrimethoxy silane, gamma-mercaptopropyl trimethoxy silane, gama-mercaptopropyl (gamma-mercaptopropyl)triethoxy silane, beta-(3,4-epoxycyclohexyl)ethyl trimethoxy silane, gamma-glycidoxypropyl trimethoxy silane, 3-vinylthiopropyl trimethoxy silane, vinyl-tris-(beta-methoxyethoxy)silane, vinyl triacetoxy silane, and mixtures thereof. A particular trialkoxysilane adhesion promoter is UCT 7840KG from United Chemical Technologies. A further adhesion promoter is KBM 803, a 3-(trimethoxysilyl)propyl thiol from Shin-Etsu Chemical Co., Ltd.

The adhesion promoter, if used, may be present in the primary coating composition in an amount of from about 0.1 to about 10% by weight, for example, from about 0.1 to about 3% by weight, and, e.g., from about 1% by weight, based upon the total weight of the composition.

Other components that may be utilized in the radiation-curable composition include pigments, such as $TiO_2$, antioxidants, such as IONOL available from Aldrich, which is a 2,4,6-tri-tert-butyl-4-methylphenol; flow control agents such as BYK331, a polysiloxane available from BYK-Chemie USA; sensitizers such as thioxanthone or isopropylthioxanthone (ITX) and their derivatives; stabilizers and wetting agents. Suitable amounts are known to those of ordinary skill in the art.

In a preferred embodiment of the invention, a radiation-curable monomer or oligomer containing a chromophore moiety(ies) is produced by a method that comprises the step of preparing a dye concentrate, or masterbatch. The dye concentrate may comprise a solvent and a chromophore-containing compound according to the invention, e.g., a radiation-curable monomer or oligomer containing a chromophore molecule according to the invention. In a particularly preferred embodiment, the solvent acts as both a solvent and reactive diluent. In a most preferred embodiment, the solvent that acts as both a solvent and a reactive diluent is tetrahydrofurfuryl acrylate (THFA).

Specifically, the chromophore-containing compounds comprising a radiation-curable functional group, or the chromophore-containing compounds comprising functional groups that react to form the radiation-curable monomers or oligomers containing chromophore moieties of the present invention, may be prepared as a liquid or powder. For example, a so-called "direct-acrylated" chromophore-containing compound may exist in liquid form. This type of compound may be used, without further manipulation, in conjunction with the other components, e.g., the monomers and oligomers that do not contain a chromophore, the photoinitiator, reactive diluent, etc., to provide the colored, radiation-curable coatings, colorants, inks or printing compositions of the present invention.

In the case where the chromophore-containing compound is in powder form, however, it must be dissolved into solution before it can be used to form a colored, radiation-curable composition according to the invention, regardless of whether the compound already contains, or has yet to be provided with, radiation-curable functionality. For example, before (or as) a powder of a chromophore-containing dye that is lacking radiation-curable functionality is reacted with, e.g., a polyisocyanate, and end-capped with one or more radiation-curable groups, e.g., groups containing ethylenic unsaturation, the compound must be dissolved into solution.

After extensive research, the present inventors have found that a powdered, chromophore-containing compound may be most suitably dissolved into solution by employing THFA as a combination solvent and reactive diluent. The use of THFA in this regard provides several advantages. For example, THFA is photocurable. Therefore, THFA does not need to be removed from the solution before the solution can be added to the coating composition. When other solvents, such as tetrahydrofuran (THF), are used to dissolve the chromophore-containing compounds into solution, any excess solvent must be removed from the solution before the solution can be added to the coating composition. Otherwise, undesirable properties may result in the coating, such as the formation of bubbles. As another example of the advantage of using THFA, it is noted that chromophore-containing compounds demonstrated increased solubility in THFA in comparison to their solubility in other acrylate-containing compounds.

Accordingly, in one method for providing a dye concentrate, an isocyanate, e.g., a diisocyanate, is reacted in THFA with at least one compound having at least one isocyanate-reactive group, such as —OH, —$NH_2$ and —SH, wherein at least a portion of the compound includes a chromophore, such as an anthraquinone, methine or azo chromophore.

The chromophore-containing compound may be charged to a reactor containing an isocyanate, a catalyst, and THFA at a rate sufficient to prevent the saturation of the solution with the chromophore-containing compound. For example, the chromophore-containing compound may be charged to the reactor over a period of from about 30 to 75 minutes, preferably 60 minutes, for a reactor maintained at a temperature of from about 40° C. to about 60° C., preferably about 50° C. The isocyanate may be present in a stoichiometric amount, e.g., the isocyanate may be present in an amount of 2 equivalents of diisocyanate per equivalent of chromophore-containing compound. The catalyst may be any suitable catalyst, such as, for example, dibutyl tin dilaurate. Once the chromophore-containing compound has been charged to the reactor, the reaction is allowed to proceed for, for example, a period of from 120 to 240 minutes, preferably about 180 minutes, while the temperature is maintained at 50° C.

The isocyanate-capped, chromophore-containing compound is provided with one or more radiation-curable groups by reducing the temperature to, and then maintaining the temperature at, from about 30° C. to about 50° C., preferably about 40° C., while a radiation-curable compound, including both (i) an isocyanate-reactive functionality and (ii) a radiation-curable functionality, such as ethylenic unsaturation, e.g., an acrylate monomer, is charged to the reactor. Preferably, an inhibitor is also added to the reaction solution. The reaction is monitored to completion by measuring the isocyanate peaks at 2270 cm$^{-1}$ by FTIR, a procedure that is well-known in the art.

After completion, there is provided a dye concentrate, or masterbatch, comprising the solvent and the radiation-curable, chromophore-containing monomers and/or oligomers. In a preferred embodiment, the radiation-curable, chromophore-containing monomers and/or oligomers are present in the dye concentrate in an amount that provides an amount of chromophore moiety that is greater than 5 wt %, preferably greater than 10 wt %, e.g., from about 10 wt % to about 35 wt %, wherein the particular wt % of the chromophore moiety is calculated by dividing the total weight of the total amount of chromophore moieties within the radiation-curable, chromophore-containing monomers and/or oligomers by the total weight of the dye concentrate (i.e., the amount of, e.g., 15 wt %, chromophore moiety does not include the weight of, e.g., any urethane or acrylate that may be present).

The preparation of a dye concentrate, or masterbatch, provides increased versatility that enables the radiation-curable, chromophore-containing monomers and/or oligomers contained in the dye concentrate to be more readily employed in a wide variety of applications.

For example, the various components of the present invention, including the dye concentrate or masterbatch, may be mixed or blended together, using any known equipment, to provide a colored, radiation-curable coating composition, and an optical fiber may be coated with the coating composition by any known optical fiber production technique. In one embodiment, a radiation-curable coating composition for providing a secondary coating on an optical fiber will comprise less than 20 wt %, for example, less than 15 wt %, preferably less than 10 wt %, more preferably less than 5 wt %, e.g., from 0.1 wt % to 10 wt %, of the dye concentrate, based on the entire weight of the radiation-curable composition. Of course, radiation-curable coating compositions may be prepared that will provide a primary, tertiary, or even single coating on an optical fiber, and the amount of dye concentrate may be specifically tailored to the particular end-use application. Likewise, a radiation-curable composition may be provided that will provide a coating on a plurality of optical fibers arranged in an array, or on an optical fiber ribbon, and again the amount of dye concentrate may be specifically tailored to the particular end-use application.

The techniques may involve a draw tower in which a preformed glass rod is heated to produce a thin fiber of glass. The fiber is pulled vertically through the draw tower and, along the way, the fiber passes through one or more coating stations at which various coatings are applied and cured in-line to the newly drawn fiber. The coating stations may each contain a die having an exit orifice that is sized to apply the particular coating to the fiber in a desired thickness. Monitoring and measuring devices may be provided near each station to ensure that the coating applied at that station is coated concentrically and to the desired diameter. Examples of optical fiber coating techniques include the methods disclosed in U.S. Pat. Nos. 4,351,657, 4,512,281, 4,531,959, 4,539,219, 4,792,347, and 4,867,775.

Alternatively, compositions comprising the dye concentrate, or masterbatch, may be formulated to serve as a colored coating or colorant package for a wide variety of other substrates, including, for example, glass, plastic, ceramic, metal, textiles, electronics and wood. Compositions comprising the dye concentrate, or masterbatch, may be employed as a coating or colorant package in the printing and inking industries, when it is desired to replace traditional pigments with dye materials in a radiation-curable, e.g., uv-curable, vehicle. As seen in the optical fiber applications, other components of the inks or colorant packages may include other radiation-curable monomers or multifunctional radiation-curable materials, photoinitiator(s), stabilizer(s), surfactant(s), etc. in order to adjust viscosity and flow characteristics for the desired application.

The inks, coatings, or colorant packages may be applied to substrates other than optical fibers by a number of methods, including printing methods, such as gravure printing, ink jet printing, etc. In one embodiment, a radiation-curable ink or colorant package will comprise less than 60 wt %, preferably less than 40 wt %, e.g., from 0.1 wt % to 35 wt %, of the dye concentrate, based on the entire weight of the radiation-curable composition.

After the substrate is coated with the radiation-curable composition, the composition may be cured by exposure to a sufficient curing amount of UV irradiation. For example, the coated fiber may be exposed to UV irradiation at a rate of from about 5 to 1000 mJ/cm$^2$.

To provide a further detailed description of the invention, several examples are provided. Specifically, several synthesis examples for forming colored radiation-curable compounds suitable for use in a radiation-curable composition for coating optical fibers and for forming optical fiber ribbon matrices are provided hereinafter. Examples of radiation-curable compositions containing the colored compounds are also provided. Finally, example preparations of dye concentrates are provided, wherein the dye concentrates can then be applied to the wide variety of applications noted herein above.

EXAMPLE 1

Yellow Oligomer 202.89 g of Milliken REACTINT™ dye yellow X15 was added dropwise to a mixture of 67.44 g isophorone diisocyanate (IPDI) and dibutyltin dilaurate that had been heated to 40° C. Care was taken that the exothermic reaction did not heat above 45° C. by controlling the addition rate. The total time taken for addition was two hours. After the last addition of IPDI, 200 g of 1,6 hexanediol diacrylate (HDODA) was added as a reactive diluent to lower viscosity along with 4.4 g of inhibitor 2,6-Di-tert-butyl-4-methylphenol. This mixture was maintained at 40° C. for two hours before addition of 35.24 g 2-hydroxyethyl acrylate (HEA) dropwise with the temperature maintained below 50° C. by controlling the rate of addition of HEA. One hour after addition, there was no detectible isocyanate peak at 2270 cm$^{-1}$ as observed by FTIR. The resulting urethane acrylate oligomeric reaction product has a yellow color.

EXAMPLE 2

Blue Oligomer 152.09 g of Milliken REACTINT™ dye blue X3LV was added dropwise to a mixture of 101.13 g isophorone diisocyanate (IPDI) and 2.98 g dibutyltin dilaurate that had been heated to 40° C. Care was taken that the exothermic reaction did not heat above 45° C. by controlling the addition rate. The total time taken for addition was two hours. After the last addition of IPDI, 200 g of 1,6 hexanediol diacrylate (HDODA) was added as a reactive diluent to lower viscosity along with 2.03 g of inhibitor 2,6-di-tert-butyl-4-methylphenol. This mixture was maintained at 40° C. for two hours before addition of 52.96 g 2-hydroxyethyl acrylate (HEA)

dropwise with the temperature maintained below 50° C. by controlling the rate of addition of HEA. Two hours after addition, there was no detectable isocyanate peak at 2270 cm$^{-1}$ as observed by FTIR. The resulting urethane acrylate oligomer reaction product has a blue color.

EXAMPLE 3

Black Oligomer 226.67 g of Milliken REACTINT™ dye black X95AB was added dropwise to a mixture of 93.30 g isophorone diisocyanate (IPDI) and 2.74 g dibutyltin dilaurate that had been heated to 40° C. Care was taken that the exothermic reaction did not heat above 45° C. by controlling the addition rate. The total time taken for addition was about two hours. After the last addition of IPDI, 200 g of tetrahydrafuran (THF) solvent was added as a reactive diluent to lower viscosity along with 2.38 g of inhibitor 2,6-di-tert-butyl-4-methylphenol. This mixture was maintained at 40° C. for two hours before addition of 48.78 g 2-hydroxyethyl acrylate (HEA) dropwise with the temperature maintained below 50° C. by controlling the rate of addition of HEA. Two hours after addition, there was no detectable isocyanate peak at 2270 cm$^{-1}$ as observed by FTIR. The THF solvent was then removed via rotovap vacuum technique at room temperature over a 10 h period until a weight equal to the original inputs (minus the solvent) was reached. The resulting urethane acrylate oligomer reaction product has a black color.

Several liquid coating compositions employing the colored radiation-curable oligomers are described hereinafter.

EXAMPLE 4

Yellow-Colored Optical Fiber Outer Coating Composition

A yellow ultraviolet radiation-curable coating composition for providing a colored outer coating was made by combining 60 weight percent EBECRYL™ 4827, which is an aromatic urethane diacrylate oligomer having a molecular weight of about 1500 sold by UCB Chemicals, 30 weight percent trimethylolpropane trimethacrylate (TMPTA) sold by UCB Chemicals, which is a reactive diluent, 6 weight percent of the yellow colored urethane acrylate oligomer reaction product of the synthesis described in Example 1 and about 4 weight percent of DAROCUR™ 4268 which is a photoinitiator. The coating composition was applied on an inner coating layer and cured by exposing the composition to ultraviolet radiation in a suitable wavelength range and intensity to form a yellow-colored outer protective polymeric coating.

EXAMPLE 5

Blue-Colored Optical Fiber Inner Coating Composition

A blue ultraviolet radiation-curable coating composition for providing a colored inner coating was made by combining 60 weight percent EBECRYL™ 230, which is a high molecular weight aliphatic urethane diacrylate oligomer (bulk oligomer) sold by UCB Chemicals, 29 weight percent beta-carboxyethyl acrylate (13-CEA) sold by UCB Chemicals, which is a monofunctional reactive diluent, 6 weight percent of the blue colored urethane acrylate oligomer reaction product of the synthesis described in Example 2 and about 5 weight percent of DAROCUR® 4265, which is a photoinitiator. The coating composition was applied on the cladding of an optical fiber and cured by exposure to ultraviolet radiation in a suitable wavelength range and intensity to form a blue-colored inner protective coating.

EXAMPLE 6

Blue-Colored Optical Fiber Outer Coating Composition

A blue ultraviolet radiation-curable coating composition for providing a colored outer coating was made by combining 60 weight percent EBECRYL™ 4827 (bulk oligomer), 30 weight percent TMPTA (reactive diluent), 6 weight percent of the blue-colored urethane acrylate oligomer reaction product of the synthesis described in Example 2 and about 4 weight percent of DAROCUR™ 4268. The coating composition was applied to the inner coating of an optical fiber to form a blue-colored outer protective polymeric coating after curing by exposure to ultraviolet radiation in a suitable wavelength range.

EXAMPLE 7

Blue-Colored Ink (Tertiary) Coating Composition

A blue ultraviolet radiation-curable coating composition for providing a colored tertiary coating was made by combining 25 weight percent EBECRYL™ 4866, which is an aliphatic urethane triacrylate diluted with 30 weight percent tripropylene glycol diacrylate (TRPGDA) sold by UCB Chemicals, 25 weight percent TMPTA (a reactive diluent), 35 weight percent of the blue-colored urethane acrylate oligomer reaction product of the synthesis described in Example 2, 10 weight percent hexanediol diacrylate (HDODA) (a reactive diluent) and about 5 weight percent of DAROCUR™ 4268. The coating composition was applied over the outer coating of an optical fiber and cured by exposure to ultraviolet radiation in a suitable wavelength range to form a blue-colored tertiary protective polymeric coating.

EXAMPLE 8

Blue Urethane Acrylate 11.16 g of isophorone diisocyanate and 0.35 g of dibutyltin dilaurate was heated to 50° C. 16.34 g of 1,5-bis ((2,2-dimethyl-3-hydroxypropyl)amino)-4,8-bis((4-methylphenyl)thio)anthraquinone was mixed with THF to get the anthracenedione into solution and added slowly to the reaction. The reaction temperature was maintained at 50° C. for three hours. The temperature was reduced to 40° C. and 0.25 g of 2,6-di-tert-butyl-4-methylphenol and 30 g of 1,6 hexanediol diacrylate was added to the reaction. 5.819 g of 2-hydroxyethyl acrylate was then added dropwise. The reaction was run to completion by measuring the isocyanate peak at 2270 cm$^{-1}$ by FTIR. The THF was evaporated off of the mixture. The resulting urethane acrylate compound was blue in color.

EXAMPLE 9

Blue-Colored Optical Fiber Outer Coating

A blue ultraviolet radiation-curable coating composition for providing a colored outer coating was made by combining 65 weight percent of EBECRYL 4827, which is a urethane acrylate oligomer (bulk oligomer), 30 weight percent tripropylene glycol diacrylate (TPGDA), which is a reactive diluent, 1 percent of the blue-colored urethane acrylate reaction product of the synthesis described in Example 8 and about 4 percent of DAROCUR™ 4268 which is a photoinitiator. The coating composition was applied to an inner coating layer and cured by exposing the composition to ultraviolet radiation at a suitable wavelength range to form a blue-colored outer protective polymeric coating.

EXAMPLE 10

Blue-Colored Optical Fiber Inner Coating

A blue ultraviolet radiation-curable coating composition for providing a colored inner coating was made by combining 65 weight percent of EBECRYL™ 230, which is a urethane acrylate oligomer, 29 weight percent β-CEA monofunctional reactive diluent, 1 percent of the blue-colored urethane acrylate reaction product of the synthesis described in Example 8 and about 5 weight percent DAROCUR™ 4265, which is a photoinitiator. The coating composition was applied to the cladding of an optical fiber and cured by exposure to ultraviolet radiation in a suitable wavelength range to form a blue colored inner protective fiber coating.

Colored Optical Fiber Ribbon

Figure 2:
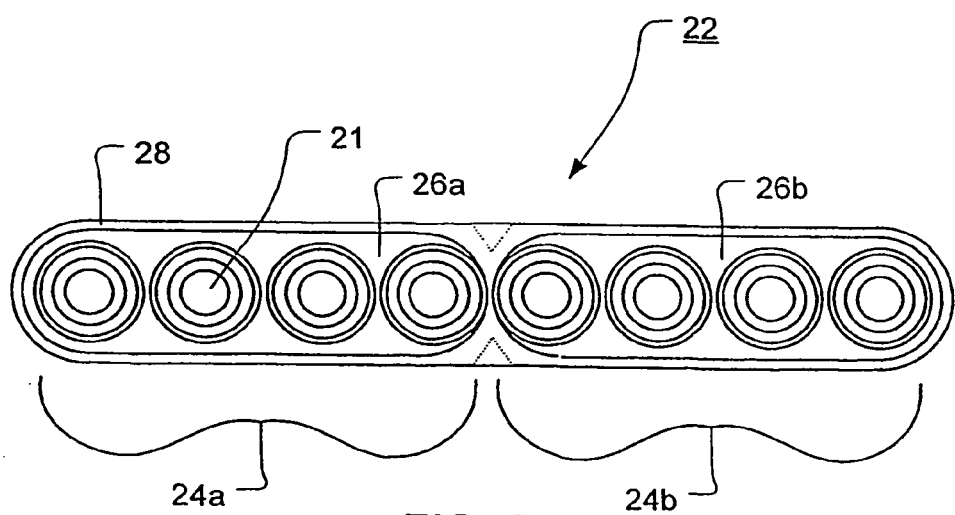
FIG. 2, which is a cross-sectional view of a splittable optical fiber ribbon containing at least one colored matrix.

Referring to FIG. 2, there is shown a typical splittable optical fiber ribbon 22 containing two planar arrays 24a, 24b of optical fibers 21. Each of the arrays of optical fibers are enveloped by a primary matrix 26a, 26b that hold the fiber arrays together. Both primary matrices 26a, 26b are enveloped by a secondary matrix 28. The primary matrices 26a, 26b, the secondary matrix 28 or both may be colored in accordance with the present invention. An example of a colored matrix is described below.

EXAMPLE 11

Blue Ribbon Matrix

A composition for forming a blue-colored optical fiber ribbon matrix was made by combining 6 weight percent of the blue oligomer reaction product described in Example 2, 60 weight percent EBECRYL™ 4866 trifunctional oligomer (bulk oligomer), 30 weight percent TMPTA (reactive diluent) and 4 weight percent DAROCUR™ 4268 photoinitiator. The resulting composition was applied over a planar array of optical fibers using ordinary application methods with a die or an applicator. The composition was cured by exposure to ultraviolet radiation in a suitable wavelength range to form a blue-colored matrix over the planar array of optical fibers.

EXAMPLE 12

Yellow Reactive Dye Color Concentrate

A reactive dye color concentrate containing a functionalized yellow dye compound was prepared according to the procedure below:

2 equivalents of isophorone diisocyanate (IPDI), 0.01 mol dibutyl tin dilaurate, and tetrahydrofurfuryl acrylate (amount sufficient to ultimately give 15% by weight chromophore moiety concentration in the color concentrate) were charged to a reactor, stirred at 650 rpm and heated to 50° C. One (1) equivalent of 2,2'-((9,10-dihydro-9,10-dioxo-1,5-anthracenediyl)bis(thio))bis-benzoic acid, 2-hydroxyethyl ester anthraquinone yellow dye was then added slowly to the reactor over a 1-hour period. The tetrahydrofurfuryl acrylate monomer served as a solvent, allowing the dye to be dissolved into solution and to react with the diisocyanate forming an isocyanate-containing, dye-containing compound. The dye was added slowly to the reactor so as not to saturate the solution, which would essentially stop the urethanization reaction.

After completion of the addition of the dye, the reaction was allowed to proceed for a 3-hour period while the temperature is maintained at 50 C. After the 3-hour reaction period, the temperature was reduced to 40° C. and 0.02 mol of 2.6-di-tert-butyl-4-methylphenol (inhibitor) was added to the reaction solution. One (1) equivalent of 2-hydroxyethyl acrylate was added slowly and reacted with the isocyanate of the isocyanate-containing, dye-containing compound. The temperature was maintained at 40° C. and the mixture was stirred for 2 hours. The reaction was monitored to completion by measuring the isocyanate peak at 2270 cm$^{-1}$ by FTIR. At the end of the two-hour reaction period, there was no free isocyanate present in the mixture as measured by FTIR.

The resulting yellow color concentrate, which contained 15% by weight of chromophore moiety based on the total weight of the color concentrate (i.e., the amount of 15 wt % chromophore moiety does not include the weight of the urethane or acrylate), was filtered through a 1-micron absolute filter. There were no solids recovered from the filter.

EXAMPLE 13

Orange Reactive Dye Color Concentrate

A reactive dye color concentrate containing a functionalized orange dye compound was prepared according to the procedure below:

2 equivalents of isophorone diisocyanate (IPDI), 0.01 mol dibutyl tin dilaurate, and tetrahydrofurfuryl acrylate (amount sufficient to ultimately give 15% by weight chromophore moiety concentration in the color concentrate) were charged to a reactor, stirred at 650 rpm and heated to 50° C. 1 equivalent of 2,5-bis-(phenylamino)terephthalic acid bis-(2-hydroxyethyl)ester anthraquinone orange dye was then added slowly to the reactor over a 1-hour period. The tetrahydrofurfuryl acrylate monomer served as a solvent allowing the dye to be dissolved into solution and to react with the diisocyanate forming an isocyanate-containing, dye-containing compound. The dye was added slowly to the reactor so as not to saturate the solution, which would essentially stop the urethanization reaction.

After completion of the addition of the dye, the reaction was allowed to proceed for a 3-hour period while the temperature was maintained at 50° C. After the 3-hour reaction period, the temperature was reduced to 40° C. and 0.02 mol of 2.6-Di-tert-butyl-4-methylphenol (inhibitor) was added to the reaction solution. One (1) equivalent of 2-hydroxyethyl acrylate was added slowly and reacted with the isocyanate of the isocyanate-containing, dye-containing compound. The temperature was maintained at 40° C. and the mixture was allowed to stir for 2 hours. The reaction was monitored to completion by measuring the isocyanate peak at 2270 cm$^{-1}$ by FTIR. At the end of the two-hour reaction period, there was no free isocyanate present in the mixture as measured by FTIR.

The resulting orange color concentrate, which contained 15% by weight of chromophore moiety based on the total weight of the color concentrate (i.e., the amount of 15 wt % chromophore moiety does not include the weight of the urethane or acrylate), was filtered through a 1-micron absolute filter. There were no solids recovered from the filter.

EXAMPLE 14

Red Reactive Dye Color Concentrate

The reactive dye color concentrate containing a functionalized red dye compound was prepared according to the procedure below:

2 equivalents of isophorone diisocyanate (IPDI), 0.01 mol dibutyl tin dilaurate, and tetrahydrofurfuryl acrylate (amount sufficient to ultimately give 15% by weight chromophore moiety concentration in the color concentrate) were charged to a reactor, stirred at 650 rpm and heated to 50° C. One (1) equivalent of 1,5-bis-{(3-hydroxypropyl)amino}-9,10-anthracenedione red anthraquinone dye was then added slowly to the reactor over a 1-hour period. The tetrahydrofurfuryl acrylate monomer served as a solvent allowing the dye to be dissolved into solution and to react with the diisocyanate forming an isocyanate-containing, dye-containing compound. The dye was added slowly to the reactor so as not to saturate the solution, which would essentially stop the urethanization reaction.

After completion of the addition of the dye, the reaction was allowed to proceed for a 3-hour period while the temperature was maintained at 50° C. After the 3-hour reaction period, the temperature was reduced to 40° C. and 0.02 mol of 2.6-Di-tert-butyl-4-methylphenol (inhibitor) was added to the reaction solution. One (1) equivalent of 2-hydroxyethyl acrylate was added slowly and reacted with the isocyanate of the isocyanate-containing, dye-containing compound. The temperature was maintained at 40° C. and the mixture was stirred for 2 hours. The reaction was monitored to completion by measuring the isocyanate peak at 2270 cm$^{-1}$ by FTIR. At the end of the two-hour reaction period, there was no free isocyanate present in the mixture as measured by FTIR.

The resulting red color concentrate, which contained 15% by weight of chromophore moiety based on the total weight of the color concentrate (i.e., the amount of 15 wt % chromophore moiety does not include the weight of the urethane or acrylate), was filtered through a 1-micron absolute filter. There were no solids recovered from the filter.

Comparative Example 1

Yellow Reactive Dye Color Concentrate

A reactive dye color concentrate containing a functionalized yellow dye compound was prepared according to the procedure below:

Two (2) equivalents of isophorone diisocyanate (IPDI), 0.01 mol dibutyl tin dilaurate, and tripropylene glycol diacrylate (TPGDA) (amount sufficient to ultimately give 15% by weight chromophore moiety concentration in the color concentrate) were charged to a reactor, stirred at 650 rpm and heated to 50° C. One (1) equivalent of 2,2'-((9,10-dihydro-9,10-dioxo-1,5-anthracenediyl)bis(thio))bis-benzoic acid, 2 hydroxyethyl ester anthraquinone yellow dye was then added slowly to the reactor over a 1-hour period. The tripropylene glycol diacrylate monomer served as a solvent allowing the dye to be dissolved into solution and to react with the diisocyanate forming an isocyanate-containing, dye-containing compound. The dye was added slowly to the reactor so as not to saturate the solution, which would essentially stop the urethanization reaction.

After completion of the addition of the dye, the reaction was allowed to proceed for a 3-hour period while the temperature was maintained at 50° C. After the 3-hour reaction period, the temperature was reduced to 40° C. and 0.02 mol of 2.6-Di-tert-butyl-4-methylphenol (inhibitor) was added to the reaction solution. One (1) equivalent of 2-hydroxyethyl acrylate was added slowly and reacted with the isocyanate of the isocyanate-containing, dye-containing compound. The temperature was maintained at 40° C. and the mixture was allowed to stir for 2 hours. The reaction was monitored to completion by measuring the isocyanate peak at 2270 cm$^{-1}$ by FTIR. At the end of the two-hour reaction period, there were approximately 0.5 equivalents of free isocyanate present.

The resulting yellow color concentrate was filtered through a 1.2-micron absolute filter. Approximately 0.6 equivalents of solid diol dye (unreacted) was recovered from the filter. The reaction was unsuccessful due to lack of solubility of the yellow anthraquinone dye in the reaction mixture when using monomer TPGDA.

Comparative Example 2

Orange Reactive Dye Color Concentrate

A reactive dye color concentrate containing a functionalized orange dye compound was prepared according to the procedure below:

2 equivalents of isophorone diisocyanate (IPDI), 0.01 mol dibutyl tin dilaurate, and tripropylene glycol diacrylate (TPGDA) (amount sufficient to ultimately give 15% by weight chromophore moiety concentration in the color concentrate) were charged to a reactor, stirred at 650 rpm and heated to 50° C. One (1) equivalent of 2,5-bis-(phenylamino) terephthalic acid bis-(2-hydroxyethyl)ester anthraquinone orange dye was then added slowly to the reactor over a 1-hour period. The tripropylene glycol diacrylate monomer served as a solvent allowing the dye to be dissolved into solution and to react with the diisocyanate forming an isocyanate-containing, dye-containing compound. The dye was added slowly to the reactor so as not to saturate the solution, which would essentially stop the urethanization reaction.

After completion of the addition of the dye, the reaction was allowed to proceed for a 3-hour period while the temperature was maintained at 50° C. After the 3-hour reaction period, the temperature was reduced to 40° C. and 0.02 mol of 2.6-Di-tert-butyl-4-methylphenol (inhibitor) is added to the reaction solution. One (1) equivalent of 2-hydroxyethyl acrylate was added slowly and reacted with the isocyanate of the isocyanate-containing, dye-containing compound. The temperature was maintained at 40° C. and the mixture was allowed to stir for 2 hours. The reaction was monitored to completion by measuring the isocyanate peak at 2270 cm$^{-1}$ by FTIR. At the end of the two-hour reaction period, there were approximately 0.2 equivalents of free isocyanate present as measured by FTIR.

The resulting orange color concentrate was filtered through a 1.2-micron absolute filter. Approximately 0.2 equivalents of unreacted solid orange anthraquinone dye were recovered from the filter. The reaction was unsuccessful due to limited solubility of the orange diol dye in the reaction mixture when using monomer TPGDA.

Comparative Example 3

Red Reactive Dye Color Concentrate

A reactive dye color concentrate containing a functionalized red dye compound was prepared according to the procedure below:

Two (2) equivalents of isophorone diisocyanate (IPDI), 0.01 mol dibutyl tin dilaurate, and tripropylene glycol diacrylate (TPGDA) (amount sufficient to ultimately give 15% by weight chromophore moiety concentration in the color concentrate) were charged to a reactor, stirred at 650 rpm and heated to 50° C. One (1) equivalent 1,5-bis-{(3-hydroxypropyl)amino}-9,10-anthracenedione red anthraquinone dye was then added slowly to the reactor over a 1-hour period. The tripropylene glycol diacrylate monomer served as a solvent allowing the dye to be dissolved into solution and to react with the diisocyanate forming an isocyanate-containing, dye-containing compound. The dye was added slowly to the reactor so as not to saturate the solution, which would essentially stop the urethanization reaction.

After completion of the addition of the dye, the reaction was allowed to proceed for a 3-hour period while the temperature was maintained at 50° C. After the 3-hour reaction period, the temperature was reduced to 40° C. and 0.02 mol of 2,6-di-tert-butyl-4-methylphenol (inhibitor) was added to the reaction solution. One (1) equivalent of 2-hydroxyethyl acrylate was added slowly and reacted with the isocyanate of the isocyanate-containing, dye-containing compound. The temperature was maintained at 40° C. and the mixture was allowed to stir for 2 hours. The reaction was monitored to completion by measuring the isocyanate peak at 2270 cm$^{-1}$ by FTIR. At the end of the two-hour reaction period, there were approximately 0.8 equivalents of free isocyanate present as measured by FTIR.

The resulting red color concentrate was filtered through a 1-micron absolute filter. Approximately 0.6 equivalents of unreacted solid red diol dye were recovered from the filter. The reaction was unsuccessful due to limited solubility of the red anthraquinone dye in the reaction mixture when using monomer TPGDA.

Comparative Example 4

Yellow Reactive Dye Color Concentrate

A reactive dye color concentrate containing a functionalized yellow dye compound was prepared according to the procedure below:

Two (2) equivalents of isophorone diisocyanate (IPDI), 0.01 mol dibutyl tin dilaurate, and 2-phenoxyethyl acrylate (2-PEA) (amount sufficient to ultimately give 15% by weight chromophore moiety concentration in the color concentrate) were charged to a reactor, stirred at 650 rpm and heated to 50° C. One (1) equivalent of 2,2'-((9,10-dihydro-9,10-dioxo-1,5-anthracenediyl)bis(thio))bis-benzoic acid, 2 hydroxyethyl ester anthraquinone yellow dye was then added slowly to the reactor over a 1-hour period. The 2-phenoxyethyl acrylate monomer served as a solvent allowing the dye to be dissolved into solution and to react with the diisocyanate forming an isocyanate-containing, dye-containing compound. The dye was added slowly to the reactor so as not to saturate the solution, which would essentially stop the urethanization reaction.

After completion of the addition of the dye, the reaction was allowed to proceed for a 3-hour period while the temperature was maintained at 50° C. After the 3-hour reaction period, the temperature was reduced to 40° C. and 0.02 mol of 2,6-Di-tert-butyl-4-methylphenol (inhibitor) was added to the reaction solution. One (1) equivalent of 2-hydroxyethyl acrylate was added slowly and reacted with the isocyanate of the isocyanate-containing, dye-containing compound. The temperature was maintained at 40° C. and the mixture was allowed to stir for 2 hours. The reaction was monitored to completion by measuring the isocyanate peak at 2270 cm$^{-1}$ by FTIR. At the end of the two-hour reaction period, there were approximately 0.8 equivalents of free isocyanate present.

The resulting yellow color concentrate was filtered through a 1.2-micron absolute filter. Approximately 0.5 equivalents of solid diol dye (unreacted) was recovered from the filter. The reaction was unsuccessful due to lack of solubility of the yellow anthraquinone dye in the reaction mixture when using monomer 2-PEA.

Comparative Example 5

Orange Reactive Dye Color Concentrate

A reactive dye color concentrate containing a functionalized orange dye compound was prepared according to the procedure below:

Two (2) equivalents of isophorone diisocyanate (IPDI), 0.01 mol dibutyl tin dilaurate, and 2-phenoxyethyl acrylate (2-PEA) (amount sufficient to ultimately give 15% by weight chromophore moiety concentration in the color concentrate) were charged to a reactor, stirred at 650 rpm and heated to 50° C. One (1) equivalent of 2,5-bis-(phenylamino)terephthalic acid bis-(2-hydroxyethyl)ester anthraquinone orange dye was then added slowly to the reactor over a 1-hour period. The 2-phenoxyethyl acrylate monomer served as a solvent allowing the dye to be dissolved into solution and to react with the diisocyanate forming an isocyanate-containing, dye-containing compound. The dye be added slowly to the reactor so as not to saturate the solution, which would essentially stop the urethanization reaction.

After completion of the addition of the dye, the reaction was allowed to proceed for a 3-hour period while the temperature was maintained at 50° C. After the 3-hour reaction period, the temperature was reduced to 40° C. and 0.02 mol of 2,6-di-tert-butyl-4-methylphenol (inhibitor) was added to the reaction solution. One (1) equivalent of 2-hydroxyethyl acrylate was added slowly and reacted with the isocyanate of the isocyanate-containing, dye-containing compound. The temperature was maintained at 40° C. and the mixture was allowed to stir for 2 hours. The reaction was monitored to completion by measuring the isocyanate peak at 2270 cm$^{-1}$ by FTIR. At the end of the two-hour reaction period, there were approximately 0.8 equivalents of free isocyanate present as measured by FTIR.

The resulting orange color concentrate was filtered through a 1.2-micron absolute filter. Approximately 0.7 equivalents of unreacted solid orange anthraquinone dye were recovered from the filter. The reaction was unsuccessful due to limited solubility of the orange diol dye in the reaction mixture when using monomer 2-PEA.

Comparative Example 6

Red Reactive Dye Color Concentrate

A reactive dye color concentrate containing a functionalized red dye compound was prepared according to the procedure below:

Two (2) equivalents of isophorone diisocyanate (IPDI), 0.01 mol dibutyl tin dilaurate, and 2-phenoxyethyl acrylate (2-PEA) (amount sufficient to ultimately give 15% by weight chromophore moiety concentration in the color concentrate) were charged to a reactor, stirred at 650 rpm and heated to 50° C. 1 equivalent 1,5-bis-{(3-hydroxypropyl)amino}-9,10-anthracenedione red anthraquinone dye was then added slowly to the reactor over a 1-hour period. The 2-phenoxyethyl acrylate monomer served as a solvent allowing the dye to be dissolved into solution and to react with the diisocyanate forming an isocyanate-containing, dye-containing compound. The dye was added slowly to the reactor so as not to saturate the solution, which would essentially stop the urethanization reaction.

After completion of the addition of the dye, the reaction was allowed to proceed for a 3-hour period while the temperature was maintained at 50° C. After the 3-hour reaction period, the temperature was reduced to 40° C. and 0.02 mol of 2,6 di-tert-butyl-4-methylphenol (inhibitor) was added to the reaction solution. One (1) equivalent of 2-hydroxyethyl acrylate was added slowly and reacted with the isocyanate of the isocyanate-containing, dye-containing compound. The temperature was maintained at 40° C. and the mixture was allowed to stir for 2 hours. The reaction was monitored to completion by measuring the isocyanate peak at 2270 cm$^{-1}$ by FTIR. At the end of the two-hour reaction period, there were approximately 0.8 equivalents of free isocyanate present as measured by FTIR.

The resulting red color concentrate was filtered through a 1-micron absolute filter. Approximately 0.6 equivalents of unreacted solid red diol dye were recovered from the filter. The reaction was unsuccessful due to limited solubility of the red anthraquinone dye in the reaction mixture when using monomer 2-PEA.

Comparative Example 7

Yellow Reactive Dye Color Concentrate

A reactive dye color concentrate containing a functionalized yellow dye compound was prepared according to the procedure below:

Two (2) equivalents of isophorone diisocyanate (IPDI), 0.01 mol dibutyl tin dilaurate, and isobornyl acrylate (IBOA) (amount sufficient to ultimately give 15% by weight chromophore moiety concentration in the color concentrate) were charged to a reactor, stirred at 650 rpm and heated to 50° C. One (1) equivalent of 2,2'-((9,10-dihydro-9,10-dioxo-1,5-anthracenediyl)bis(thio))bis-benzoic acid, 2 hydroxyethyl ester anthraquinone yellow dye was then added slowly to the reactor over a 1-hour period. The isobornyl acrylate monomer served as a solvent allowing the dye to be dissolved into solution and to react with the diisocyanate forming an isocyanate-containing, dye-containing compound. The dye was added slowly to the reactor so as not to saturate the solution, which would essentially stop the urethanization reaction.

After completion of the addition of the dye, the reaction was allowed to proceed for a 3-hour period while the temperature was maintained at 50° C. After the 3-hour reaction period, the temperature was reduced to 40° C. and 0.02 mol of 2.6-di-tert-butyl-4-methylphenol (inhibitor) was added to the reaction solution. One (1) equivalent of 2-hydroxyethyl acrylate was added slowly and reacted with the isocyanate of the isocyanate-containing, dye-containing compound. The temperature was maintained at 40° C. and the mixture was allowed to stir for 2 hours. The reaction was monitored to completion by measuring the isocyanate peak at 2270 cm$^{-1}$ by FTIR. At the end of the two-hour reaction period, there were approximately 0.6 equivalents of free isocyanate present.

The resulting yellow color concentrate was filtered through a 1.2-micron absolute filter. Approximately 0.6 equivalents of solid diol dye (unreacted) was recovered from the filter. The reaction was unsuccessful due to lack of solubility of the yellow anthraquinone dye in the reaction mixture when using monomer IBOA.

Comparative Example 8

Orange Reactive Dye Color Concentrate

A reactive dye color concentrate containing a functionalized orange dye compound was prepared according to the procedure below:

Two (2) equivalents of isophorone diisocyanate (IPDI), 0.01 mol dibutyl tin dilaurate, and isobornyl acrylate (IBOA) (amount sufficient to ultimately give 15% by weight chromophore moiety concentration in the color concentrate) were charged to a reactor, stirred at 650 rpm and heated to 50° C. One (1) equivalent of 2,5-bis-(phenylamino)terephthalic acid bis-(2-hydroxyethyl)ester anthraquinone orange dye was then added slowly to the reactor over a 1-hour period. The isobornyl acrylate monomer served as a solvent allowing the dye to be dissolved into solution and to react with the diisocyanate forming an isocyanate-containing, dye-containing compound. The dye be added slowly to the reactor so as not to saturate the solution, which would essentially stop the urethanization reaction.

After completion of the addition of the dye, the reaction was allowed to proceed for a 3-hour period while the temperature was maintained at 50° C. After the 3-hour reaction period, the temperature was reduced to 40° C. and 0.02 mol of 2.6-di-tert-butyl-4-methylphenol (inhibitor) was added to the reaction solution. One (1) equivalent of 2-hydroxyethyl acrylate was added slowly and reacted with the isocyanate of the isocyanate-containing, dye-containing compound. The temperature was maintained at 40 C and the mixture was allowed to stir for 2 hours. The reaction was monitored to completion by measuring the isocyanate peak at 2270 cm$^{-1}$ by FTIR. At the end of the two-hour reaction period, there were approximately 0.4 equivalents of free isocyanate present as measured by FTIR.

The resulting orange color concentrate was filtered through a 1.2-micron absolute filter. Approximately 0.4 equivalents of unreacted solid orange anthraquinone dye were recovered from the filter. The reaction was unsuccessful due to limited solubility of the orange diol dye in the reaction mixture when using monomer IBOA.

Comparative Example 9

Red Reactive Dye Color Concentrate

A reactive dye color concentrate containing a functionalized red dye compound was prepared according to the procedure below:

Two (2) equivalents of isophorone diisocyanate (IPDI), 0.01 mol dibutyl tin dilaurate, and isobornyl acrylate (BOA) (amount sufficient to ultimately give 15% by weight chromophore moiety concentration in the color concentrate) were charged to a reactor, stirred at 650 rpm and heated to 50° C. One (1) equivalent 1,5-bis-{(3-hydroxypropyl)amino}-9,10-anthracenedione red anthraquinone dye was then added slowly to the reactor over a 1-hour period. The isobornyl acrylate monomer served as a solvent allowing the dye to be dissolved into solution and to react with the diisocyanate forming an isocyanate-containing, dye-containing compound. The dye be added slowly to the reactor so as not to saturate the solution, which would essentially stop the urethanization reaction.

After completion of the addition of the dye, the reaction was allowed to proceed for a 3-hour period while the temperature was maintained at 50° C. After the 3-hour reaction period, the temperature was reduced to 40° C. and 0.02 mol of 2.6-di-tert-butyl-4-methylphenol (inhibitor) was added to the reaction solution. One (1) equivalent of 2-hydroxyethyl acrylate was added slowly and reacted with the isocyanate of the isocyanate-containing, dye-containing compound. The temperature was maintained at 40 C and the mixture was allowed to stir for 2 hours. The reaction was monitored to completion by measuring the isocyanate peak at 2270 cm$^{-1}$ by FTIR. At the end of the two-hour reaction period, there were approximately 0.8 equivalents of free isocyanate present as measured by FTIR.

The resulting red color concentrate was filtered through a 1-micron absolute filter. Approximately 0.7 equivalents of unreacted solid red diol dye were recovered from the filter. The reaction was unsuccessful due to limited solubility of the red anthraquinone dye in the reaction mixture when using monomer IBOA.

The embodiments disclosed herein admirably achieve the objects of the present invention; however, it should be appreciated by those skilled in the art that departures can be made by those skilled in the art without departing from the spirit and scope of the invention which is limited only by the following claims.

What is claimed is:

1. A telecommunication element having a color identifying coating thereon, the telecommunication element comprising:
an elongated communication transmission medium; and
a coating having an identifying color applied on at least a portion of the transmission medium,
wherein said coating comprises a radiation-cured, crosslinked, polymeric network, and
wherein the identifying color in the coating is at least in part provided by at least one anthraquinone dye covalently bonded by at least one covalent bond to said polymeric network;
wherein the anthraquinone dye is selected from the group consisting of 1,5-bis((3-hydroxy-2,2-dimethylpropyl) amino)-9,10-anthracenedione; 2,2'-((9,10-dihydro-9,10-dioxo-1,5-anthracenediyl)bis(thio)bis-benzoic acid, 2-hydroxyethyl ester; and 1,5-bis((2,2-dimethyl-3-hydroxypropyl)amino)-4,8-bis((4-methylphenyl)thio)anthraquinone.

2. The telecommunications element of claim 1, wherein:
(a) the elongated transmission medium is selected from the group consisting of (i) an optical fiber having a core and a cladding surrounding the core, (ii) an optical fiber having a core, a cladding surrounding the core, and one or more polymeric coatings on the cladding, (iii) a plurality of optical fibers arranged in an array, and (iv) an optical fiber ribbon; and
(b) the identifying color is thermally stable and light fast.

3. A radiation-curable, chromophore-containing compound, comprising at least one radiation-curable group and at least one chromophore moiety, wherein the radiation-curable, chromophore-containing compound comprises the reaction product of:
(a) an isocyanate-containing compound comprising (i) at least one isocyanate group and (ii) the at least one chromophore moiety; and
(b) a radiation-curable compound comprising (i) at least one isocyanate-reactive functional group and (ii) the at least one radiation-curable group,
wherein the at least one radiation-curable group of said radiation-curable, chromophore-containing compound is covalently bonded to said radiation-curable, chromophore-containing compound by at least one covalent bond formed by reacting an isocyanate-reactive functional group (i) of said radiation-curable compound (b) with an isocyanate group (i) of said isocyanate-containing compound (a), and said isocyanate-containing compound (a) is the reaction product of:
(c) a chromophore-containing compound comprising (i) a chromophore moiety and (ii) at least one isocyanate-reactive functional group; and
(d) a polyisocyanate,
wherein the chromophore moiety (i) of said chromophore-containing compound (c) is an anthraquinone dye, and
wherein the anthraquinone dye is selected from the group consisting of 1,5-bis((3-hydroxy-2,2-dimethylpropyl) amino)-9,10-anthracenedione; 2,2'-((9,10-dihydro-9,10-dioxo-1,5-anthracenediyl)bis(thio))bis-benzoic acid, 2-hydroxyethyl ester; and 1,5-bis((2,2-dimethyl-3-hydroxypropyl)amino)-4,8-bis((4-methylphenyl)thio) anthraquinone.

4. The radiation-curable, chromophore-containing compound of claim 3, wherein the anthraquinone dye is 1,5-bis ((2,2-dimethyl-3-hydroxypropyl)amino)-4,8-bis((4-methylphenyl)thio)anthraquinone.

5. A radiation-curable composition, comprising:
(a) a non-chromophore-containing, radiation-curable oligomer; and
(b) a radiation-curable, chromophore-containing compound,
wherein the radiation-curable, chromophore-containing compound comprises at least one radiation-curable group and at least one chromophore moiety, wherein the radiation-curable, chromophore-containing compound comprises the reaction product of:
(a) an isocyanate-containing compound comprising (i) at least one isocyanate group and (ii) the at least one chromophore moiety; and
(b) a radiation-curable compound comprising (i) at least one isocyanate-reactive functional group and (ii) the at least one radiation-curable group,
wherein the at least one radiation-curable group of said radiation-curable, chromophore-containing compound is covalently bonded to said radiation-curable, chromophore-containing compound by at least one covalent bond formed by reacting an isocyanate-reactive functional group (i) of said radiation-curable compound (b) with an isocyanate group (i) of said isocyanate-containing compound (a), and said isocyanate-containing compound (a) is the reaction product of:
(c) a chromophore-containing compound comprising (i) a chromophore moiety and (ii) at least one isocyanate-reactive functional group; and
(d) a polyisocyanate, and
wherein the composition further comprises $TiO_2$.

6. A dye concentrate, comprising a radiation-curable, chromophore-containing compound and tetrahydrofurfuryl acrylate (THFA),
wherein the radiation-curable, chromophore-containing compound comprises at least one radiation-curable group and at least one chromophore moiety, wherein the radiation-curable, chromophore-containing compound comprises the reaction product of:
(a) an isocyanate-containing compound comprising (i) at least one isocyanate group and (ii) the at least one chromophore moiety; and
(b) a radiation-curable compound comprising (i) at least one isocyanate-reactive functional group and (ii) the at least one radiation-curable group, and
wherein the at least one radiation-curable group of said radiation-curable, chromophore-containing compound is covalently bonded to said radiation-curable, chromophore-containing compound by at least one covalent bond formed by reacting an isocyanate-reactive functional group (i) of said radiation-curable compound (b) with an isocyanate group (i) of said isocyanate-containing compound (a), and said isocyanate-containing compound (a) is the reaction product of:
(c) a chromophore-containing compound comprising (i) a chromophore moiety and (ii) at least one isocyanate-reactive functional group; and
(d) a polyisocyanate.

7. A radiation-curable composition, comprising:
(a) a non-chromophore-containing, radiation-curable oligomer; and
(b) the dye concentrate according to claim 6.

8. The radiation-curable composition of claim 7, wherein the composition further comprises $TiO_2$.

9. The radiation-curable composition of claim 7, wherein the composition further comprises one or more of a photoinitiator, a reactive diluent, a stabilizer, and a surfactant.

10. A substrate having the radiation-curable composition of claim 7 on at least a portion thereof.

11. The substrate of claim 10, wherein the substrate is selected from the group consisting of (i) an optical fiber having a core and a cladding surrounding the core, (ii) an optical fiber having a core, a cladding surrounding the core, and one or more polymeric coatings on the cladding, (iii) a plurality of optical fibers arranged in an array, and (iv) an optical fiber ribbon.

12. A method for producing a color-identifying, radiation-cured composition on at least a portion of a substrate, wherein the color-identifying, radiation-cured composition has at least one chromophore moiety covalently bonded to at least one other component of the color-identifying, radiation-cured composition, the method comprising the steps of:
  providing a substrate;
  providing a radiation-curable composition according to claim 7;
  applying the radiation-curable composition to at least a portion of the substrate; and
  subjecting the applied composition for a suitable period of time to radiation of a suitable wavelength and intensity to cause curing of the composition into the color-identifying, radiation-cured composition.

13. The method of claim 12, wherein the substrate is selected from the group consisting of (i) an optical fiber having a core and a cladding surrounding the core, (ii) an optical fiber having a core, a cladding surrounding the core, and one or more polymeric coatings on the cladding, (iii) a plurality of optical fibers arranged in an array, and (iv) an optical fiber ribbon.

14. The dye concentrate of claim 6, wherein the dye concentrate comprises greater than 5 wt % chromophore moiety, based on the total weight of the dye concentrate.

15. A radiation-curable composition, comprising:
  (a) a non-chromophore-containing, radiation-curable oligomer; and
  (b) the dye concentrate according to claim 14.

16. The dye concentrate of claim 6, wherein the dye concentrate comprises from about 10 wt % to about 35 wt % of chromophore moiety, based on the total weight of the dye concentrate.

17. A radiation-curable composition, comprising:
  (a) a non-chromophore-containing, radiation-curable oligomer; and
  (b) the dye concentrate according to claim 16.

18. A dye concentrate comprising a blend of two or more radiation-curable, chromophore-containing compounds and tetrahydrofurfuryl acrylate (THFA),
  wherein at least the chromophore moiety of a first radiation-curable, chromophore-containing compound is different from the chromophore moiety of a second radiation-curable, chromophore-containing compound,
  wherein the two or more radiation-curable, chromophore-containing compounds comprise at least one radiation-curable group and at least one chromophore moiety,
  wherein the radiation-curable, chromophore-containing compounds comprise the reaction product of:
  (a) an isocyanate-containing compound comprising (i) at least one isocyanate group and (ii) the at least one chromophore moiety; and
  (b) a radiation-curable compound comprising (i) at least one isocyanate-reactive functional group and (ii) the at least one radiation-curable group, and
  wherein, for each of the radiation-curable, chromophore-containing compounds, the at least one radiation-curable group of said radiation-curable, chromophore-containing compound is covalently bonded to said radiation-curable, chromophore-containing compound by at least one covalent bond formed by reacting an isocyanate-reactive functional group (i) of said radiation-curable compound (b) with an isocyanate group (i) of said isocyanate-containing compound (a), and said isocyanate-containing compound (a) is the reaction product of:
  (c) a chromophore-containing compound comprising (i) a chromophore moiety and (ii) at least one isocyanate-reactive functional group; and
  (d) a polyisocyanate.

19. A radiation-curable composition, comprising:
  (a) a non-chromophore-containing, radiation-curable oligomer; and
  (b) the dye concentrate according to claim 18.

20. A radiation-curable, chromophore-containing compound, comprising at least one radiation-curable group and at least one chromophore moiety,
  wherein the radiation-curable, chromophore-containing compound comprises the reaction product of:
  (a) a chromophore-containing compound comprising (i) at least one isocyanate-reactive functional group and (ii) the at least one chromophore moiety; and
  (b) a radiation-curable compound comprising (i) at least one isocyanate group and (ii) the at least one radiation-curable group,
  wherein the at least one radiation-curable group of said radiation-curable, chromophore-containing compound is covalently bonded to said radiation-curable, chromophore-containing compound by at least one covalent bond formed by reacting an isocyanate group (i) of said radiation-curable compound (b) with an isocyanate-reactive functional group (i) of said chromophore-containing compound (a), and
  wherein the chromophore-containing compound (a) is selected from the group consisting of 1,5-bis((3-hydroxy-2,2-dimethylpropyl)amino)-9,10-anthracenedione; 2,2'-((9,10-dihydro-9,10-dioxo-1,5-anthracenediyl)bis(thio))bis-benzoic acid, 2-hydroxyethyl ester; and 1,5-bis((2,2-dimethyl-3-hydroxypropyl)amino)-4,8-bis((4-methylphenyl)thio)anthraquinone.

21. The radiation-curable, chromophore-containing compound of claim 20, wherein the chromophore-containing compound (a) is 1,5-bis((2,2-dimethyl-3-hydroxypropyl)amino)-4,8-bis((4-methylphenyl)thio)anthraquinone.

22. A radiation-curable composition, comprising:
  (a) a non-chromophore-containing, radiation-curable oligomer; and
  (b) a radiation-curable, chromophore-containing compound,
  wherein the radiation-curable, chromophore-containing compound comprises at least one radiation-curable group and at least one chromophore moiety,
  wherein the radiation-curable, chromophore-containing compound comprises the reaction product of:
  (a) a chromophore-containing compound comprising (i) at least one isocyanate-reactive functional group and (ii) the at least one chromophore moiety; and
  (b) a radiation-curable compound comprising (i) at least one isocyanate group and (ii) the at least one radiation-curable group,
  wherein the at least one radiation-curable group of said radiation-curable, chromophore-containing compound is covalently bonded to said radiation-curable, chromophore-containing compound by at least one covalent bond formed by reacting an isocyanate group (i) of said radiation-curable compound (b) with an isocyanate-reactive functional group (i) of said chromophore-containing compound (a), and wherein the composition further comprises TiO$_2$.

23. A dye concentrate, comprising a radiation-curable, chromophore-containing compound and tetrahydrofurfuryl acrylate (THFA),
wherein the radiation-curable, chromophore-containing compound comprises at least one radiation-curable group and at least one chromophore moiety,
wherein the radiation-curable, chromophore-containing compound comprises the reaction product of:
(a) a chromophore-containing compound comprising (i) at least one isocyanate-reactive functional group and (ii) the at least one chromophore moiety; and
(b) a radiation-curable compound comprising (i) at least one isocyanate group and (ii) the at least one radiation-curable group, and
wherein the at least one radiation-curable group of said radiation-curable, chromophore-containing compound is covalently bonded to said radiation-curable, chromophore-containing compound by at least one covalent bond formed by reacting an isocyanate group (i) of said radiation-curable compound (b) with an isocyanate-reactive functional group (i) of said chromophore-containing compound (a).

24. A radiation-curable composition, comprising:
(a) a non-chromophore-containing, radiation-curable oligomer; and
(b) the dye concentrate according to claim 23.

25. The radiation-curable composition of claim 24, wherein the composition further comprises TiO$_2$.

26. The radiation-curable composition of claim 24, wherein the composition further comprises one or more of a photoinitiator, a reactive diluent, a stabilizer, and a surfactant.

27. A substrate having the radiation-curable composition of claim 24 on at least a portion thereof.

28. The substrate of claim 27, wherein the substrate is selected from the group consisting of (i) an optical fiber having a core and a cladding surrounding the core, (ii) an optical fiber having a core, a cladding surrounding the core, and one or more polymeric coatings on the cladding, (iii) a plurality of optical fibers arranged in an array, and (iv) an optical fiber ribbon.

29. A method for producing a color-identifying, radiation-cured composition on at least a portion of a substrate, wherein the color-identifying, radiation-cured composition has at least one chromophore moiety covalently bonded to at least one other component of the color-identifying, radiation-cured composition, the method comprising the steps of:
providing a substrate;
providing a radiation-curable composition according to claim 24;
applying the radiation-curable composition to at least a portion of the substrate; and
subjecting the applied composition for a suitable period of time to radiation of a suitable wavelength and intensity to cause curing of the composition into the color-identifying, radiation-cured composition.

30. The method of claim 29, wherein the substrate is selected from the group consisting of (i) an optical fiber having a core and a cladding surrounding the core, (ii) an optical fiber having a core, a cladding surrounding the core, and one or more polymeric coatings on the cladding, (iii) a plurality of optical fibers arranged in an array, and (iv) an optical fiber ribbon.

31. The dye concentrate of claim 23, wherein the dye concentrate comprises greater than 5 wt % chromophore moiety, based on the total weight of the dye concentrate.

32. A radiation-curable composition, comprising:
(a) a non-chromophore-containing, radiation-curable oligomer; and
(b) the dye concentrate according to claim 31.

33. The dye concentrate of claim 23, wherein the dye concentrate comprises from about 10 wt % to about 35 wt % of chromophore moiety, based on the total weight of the dye concentrate.

34. A radiation-curable composition, comprising:
(a) a non-chromophore-containing, radiation-curable oligomer; and
(b) the dye concentrate according to claim 33.

35. A dye concentrate comprising a blend of two or more radiation-curable, chromophore-containing compounds and tetrahydrofurfuryl acrylate (THFA),
wherein at least the chromophore moiety of a first radiation-curable, chromophore-containing compound is different from the chromophore moiety of a second radiation-curable, chromophore-containing compound,
wherein the two or more radiation-curable, chromophore-containing compounds comprise at least one radiation-curable group and at least one chromophore moiety,
wherein the radiation-curable, chromophore-containing compounds comprise the reaction product of:
(a) a chromophore-containing compound comprising (i) at least one isocyanate-reactive functional group and (ii) the at least one chromophore moiety; and
(b) a radiation-curable compound comprising (i) at least one isocyanate group and (ii) the at least one radiation-curable group,
wherein, for each of the radiation-curable, chromophore-containing compounds, the at least one radiation-curable group of said radiation-curable, chromophore-containing compound is covalently bonded to said radiation-curable, chromophore-containing compound by at least one covalent bond formed by reacting an isocyanate group (i) of said radiation-curable compound (b) with an isocyanate-reactive functional group (i) of said chromophore-containing compound (a).

36. A radiation-curable composition, comprising:
(a) a non-chromophore-containing, radiation-curable oligomer; and
(b) the dye concentrate according to claim 35.

37. A radiation-curable composition, comprising:
(a) a non-chromophore-containing, radiation-curable oligomer;
(b) a radiation-curable, chromophore-containing compound comprising at least one radiation-curable group and at least one chromophore moiety, and
(c) TiO$_2$;
wherein the at least one chromophore moiety is a methine dye, and the methine dye comprises a methine core group with at least one substituent comprising the at least one radiation-curable group, or the at least one chromophore moiety is an azo dye, and the azo dye comprises an azo core group with at least one substituent comprising the at least one radiation-curable group.

38. A dye concentrates comprising a radiation-curable, chromophore-containing compound and tetrahydrofurfuryl acrylate (THFA),
wherein the radiation-curable, chromophore-containing compound comprises at least one radiation-curable group and at least one chromophore moiety.

39. A radiation-curable composition, comprising:
(a) a non-chromophore-containing, radiation-curable oligomer; and
(b) the dye concentrate according to claim 38.

40. The radiation-curable composition of claim 39, wherein the composition further comprises $TiO_2$.

41. The radiation-curable composition of claim 39, wherein the composition further comprises one or more of a photoinitiator, a reactive diluent, a stabilizer, and a surfactant.

42. A substrate having the radiation-curable composition of claim 39 on at least a portion thereof.

43. The substrate of claim 42, wherein the substrate is selected from the group consisting of (i) an optical fiber having a core and a cladding surrounding the core, (ii) an optical fiber having a core, a cladding surrounding the core, and one or more polymeric coatings on the cladding, (iii) a plurality of optical fibers arranged in an array, and (iv) an optical fiber ribbon.

44. A method for producing a color-identifying, radiation-cured composition on at least a portion of a substrate, wherein the color-identifying, radiation-cured composition has at least one chromophore moiety covalently bonded to at least one other component of the color-identifying, radiation-cured composition, the method comprising the steps of:
providing a substrate;
providing a radiation-curable composition according to claim 39;
applying the radiation-curable composition to at least a portion of the substrate; and
subjecting the applied composition for a suitable period of time to radiation of a suitable wavelength and intensity to cause curing of the composition into the color-identifying, radiation-cured composition.

45. The method of claim 44, wherein the substrate is selected from the group consisting of (i) an optical fiber having a core and a cladding surrounding the core, (ii) an optical fiber having a core, a cladding surrounding the core, and one or more polymeric coatings on the cladding, (iii) a plurality of optical fibers arranged in an array, and (iv) an optical fiber ribbon.

46. The dye concentrate of claim 38, wherein the dye concentrate comprises greater than 5 wt % chromophore moiety, based on the total weight of the dye concentrate.

47. A radiation-curable composition, comprising:
(a) a non-chromophore-containing, radiation-curable oligomer; and
(b) the dye concentrate according to claim 46.

48. The dye concentrate of claim 38, wherein the dye concentrate comprises from about 10 wt % to about 35 wt % of chromophore moiety, based on the total weight of the dye concentrate.

49. A radiation-curable composition, comprising:
(a) a non-chromophore-containing, radiation-curable oligomer; and
(b) the dye concentrate according to claim 48.

50. A dye concentrate, comprising a blend of two or more radiation-curable, chromophore-containing compounds and tetrahydrofurfuryl acrylate (THFA),
wherein at least the chromophore moiety of a first radiation-curable, chromophore-containing compound is different from the chromophore moiety of a second radiation-curable, chromophore-containing compound, and
wherein the two or more radiation-curable, chromophore-containing compounds comprise at least one radiation-curable group and at least one chromophore moiety.

51. A radiation-curable composition, comprising:
(a) a non-chromophore-containing, radiation-curable oligomer; and
(b) the dye concentrate according to claim 50.

52. A radiation-curable composition, comprising:
(a) a non-chromophore-containing, radiation-curable oligomer; and two or more of
(b) a radiation-curable, chromophore-containing compound comprising at least one radiation-curable group and at least one chromophore moiety, wherein the radiation-curable, chromophore-containing compound (b) comprises the reaction product of
(A1) an isocyanate-containing compound comprising (i) at least one isocyanate group and (ii) the at least one chromophore moiety; and
(B1) a radiation-curable compound comprising (i) at least one isocyanate-reactive functional group and (ii) the at least one radiation-curable group,
wherein the at least one radiation-curable group of said radiation-curable chromophore-containing compound (b) is covalently bonded to said radiation-curable, chromophore-containing compound (b) by at least one covalent bond formed by reacting an isocyanate-reactive functional group (i) of said radiation-curable compound (B1) with an isocyanate group (i) of said isocyanate-containing compound (A1), and said isocyanate-containing compound (A1) is the reaction product of
(C) a chromophore-containing compound comprising (i) a chromophore moiety and (ii) at least one isocyanate-reactive functional group; and
(D) a polyisocyanate;
(c) a radiation-curable, chromophore-containing compound comprising at least one radiation-curable group and at least one chromophore moiety,
wherein the radiation-curable, chromophore-containing compound (c) comprises the reaction product of
(A2) a chromophore-containing compound comprising (i) at least one isocyanate-reactive functional group and (ii) the at least one chromophore moiety; and
(B2) a radiation-curable compound comprising (i) at least one isocyanate group and (ii) the at least one radiation-curable group,
wherein the at least one radiation-curable group of said radiation-curable, chromophore-containing compound (c) is covalently bonded to said radiation-curable, chromophore-containing compound (c) by at least one covalent bond formed by reacting an isocyanate group (i) of said radiation-curable compound (B2) with an isocyanate-reactive functional group (i) of said chromophore-containing compound (A2); and
(d) a radiation-curable, chromophore-containing compound comprising at least one radiation-curable group and at least one chromophore moiety,
wherein the at least one chromophore moiety is a methine dye, and the methine dye comprising a methine core group with at least one substituent comprising the at least one radiation-curable group, or the at least one chromophore moiety is an azo dye, and the azo dye comprises an azo core group with at least one substituent comprising the at least one radiation-curable group.

53. A dye concentrate) comprising tetrahydrofurfuryl acrylate (THFA) and two or more of a first radiation-curable, chromophore-containing compound, a second radiation-curable, chromophore-containing compound, and a third radiation-curable, chromophore-containing compound, wherein the first radiation-curable, chromophore-containing compound comprises at least one radiation-curable group and at least one chromophore moiety, wherein the first radiation-curable, chromophore-containing compound comprises the reaction product of:
(a1) an isocyanate-containing compound comprising (i) at least one isocyanate group and (ii) the at least one chromophore moiety; and
(b1) a radiation-curable compound comprising (i) at least one isocyanate-reactive functional group and (ii) the at least one radiation-curable group, wherein the at least one radiation-curable group of said first radiation-curable, chromophore-containing compound is covalently bonded to said first radiation-curable, chromophore-containing compound by at least one covalent bond formed by reacting an isocyanate-reactive functional group (i) of said radiation-curable compound (b1) with an isocyanate group (i) of said isocyanate-containing compound (a1), and said isocyanate-containing compound (a1) is the reaction product of:
(c) a chromophore-containing compound comprising (i) a chromophore moiety and (ii) at least one isocyanate-reactive functional group; and
(d) a polyisocyanate, wherein the second radiation-curable, chromophore-containing compound comprises at least one radiation-curable group and at least one chromophore moiety, wherein the second radiation-curable, chromophore-containing compound comprises the reaction product of:
(a2) a chromophore-containing compound comprising (i) at least one isocyanate-reactive functional group and (ii) the at least one chromophore moiety; and
(b2) a radiation-curable compound comprising (i) at least one isocyanate group and (ii) the at least one radiation-curable group, wherein the at least one radiation-curable group of said second radiation-curable, chromophore-containing compound is covalently bonded to said second radiation-curable, chromophore-containing compound by at least one covalent bond formed by reacting an isocyanate group (i) of said radiation-curable compound (b2) with an isocyanate-reactive functional group (i) of said chromophore-containing compound (a2), and, wherein the third radiation-curable, chromophore-containing compound is radiation-curable, chromophore-containing compound comprising at least one radiation-curable group and at least one chromophore moiety, wherein the at least one chromophore moiety is a methine dye, and the methine dye comprises a methine core group with at least one substituent comprising the at least one radiation-curable group, or the at least one chromophore moiety is an azo dye, and the azo dye comprises an azo core group with at least one substituent comprising the at least one radiation-curable group.

54. A radiation-curable composition, comprising:
(a) a non-chromophore-containing, radiation-curable oligomer; and
(b) the dye concentrate according to claim 53.

55. A colored oligomer for providing color to a coating on a communications element, said colored oligomer comprising the reaction product of:
(a) an isocyanate end capped oligomer; and
(b) a radiation curable monomer having both (i) a reactive functionality which is reactive with isocyanate and (ii) ethylenic unsaturation, wherein said colored oligomer is end capped with radiation curable groups by covalent linkages formed by reacting said reactive functionality (i) of said radiation curable monomer (b) with an isocyanate moiety of said isocyanate end capped oligomer (a), and said isocyanate end capped oligomer (a) is the reaction product of:
(c) at least one polyfunctional compound having at least two isocyanate reactive groups; and
(d) at least one polyisocyanate, said polyfunctional compound (c) comprising at least one dye having at least two isocyanate reactive functionalities, wherein said dye is an anthraquinone dye, and said anthraquinone dye is selected from the group consisting of 1,5-bis((3-hydroxy-2,2-dimethylpropyl)amino)-9,10-anthracenedione; 2,2'-((9,10-dihydro-9,10-dioxo-1,5-anthracenediyl)bis(thio))bis-benzoic acid, 2-hydroxyethyl ester; and 1,5-bis((2,2-dimethyl-3-hydroxypropyl)amino)-4,8-bis((4-methylphenyl)thio) anthraquinone.

56. The colored oligomer of claim 55, wherein said anthraquinone dye is 1,5-bis((2,2-dimethyl-3-hydroxypropyl)amino)-4,8-bis((4-methylphenyl)thio)anthraquinone.

57. The colored oligomer of claim 55, wherein a (meth)acrylic group represents the ethylenic unsaturation (ii) in the radiation curable monomer (b).

58. A photocurable resin composition for forming a colored, cured coating on an optical fiber, said resin composition comprising:
(e) at least one (meth)acrylate end capped urethane oligomer;
(f) at least one photoinitiator;
(g) at least one reactive diluent; and
(h) at least one colored oligomer according to claim 55.

59. An optical fiber, comprising a colored, cured coating, said colored, cured coating having been formed from the photocurable resin composition of claim 58.

60. A reactive anthraquinone dye for providing color to a coating on an optical fiber, said reactive anthraquinone dye comprising an anthraquinone core group with at least one substituent comprising a radiation curable group, wherein said radiation curable group is an ethylenically unsaturated group or an epoxy group;

wherein said reactive anthraquinone dye has the following formula:

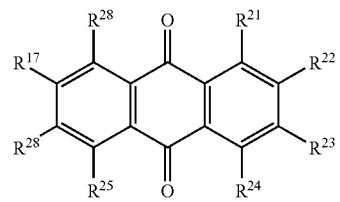

wherein R groups $R^1$, $R^2$, $R^3$, $R^4$, $R^5$, $R^6$, $R^7$ and $R^8$ are each independently selected from the group consisting of hydrogen, amino, hydroxy, halogen, nitro, carboxylated alkali metal, sulfated alkali metal and a hydrocarbyl group optionally containing one or more heteroatoms, provided that at least one of R groups $R^{11}$ through $R^{18}$ have at least one ethylenically unsaturated radiation curable functionality;

wherein the reactive anthraquinone dye has one of the following formulas:

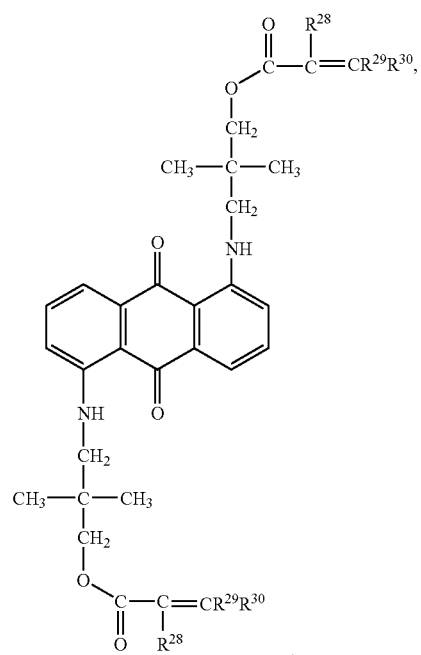

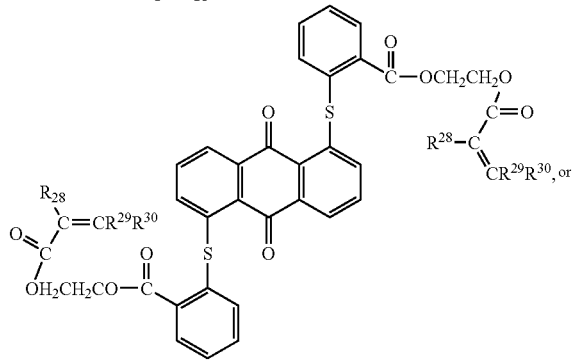

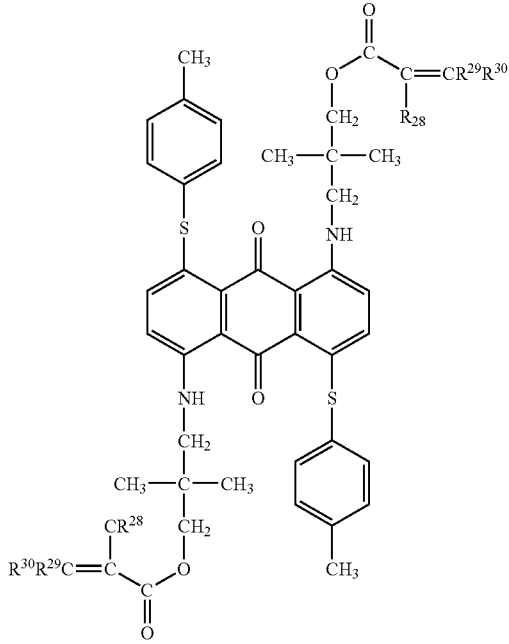

wherein $R^{29}$, $R^{30}$, $R^{31}$, $R^{32}$, $R^{33}$, and $R^{34}$ are the same or different and are independently hydrogen or a $C_1$ to $C_6$ alkyl optionally substituted with one or more substituents selected from the group consisting of —OH, —NH$_2$, —SH, —NO$_2$, —CN and halogen.

* * * * *